US009800201B1

(12) United States Patent
Atcha et al.

(10) Patent No.: US 9,800,201 B1
(45) Date of Patent: *Oct. 24, 2017

(54) PHOTOVOLTAIC PANEL RACKING SYSTEM

(71) Applicant: Polar Racking Inc., Toronto (CA)

(72) Inventors: Imran Atcha, Toronto (CA); Dorin Lucian Raileanu, Toronto (CA); Matthew Paul Marentette, Toronto (CA); Volodymyr Yarusevych, Toronto (CA)

(73) Assignee: Polar Racking Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,960

(22) Filed: Apr. 17, 2017

Related U.S. Application Data

(63) Continuation of application No. 15/260,950, filed on Sep. 9, 2016, now Pat. No. 9,628,019.

(51) Int. Cl.
*H02S 20/24* (2014.01)
*F24J 2/52* (2006.01)
*H02S 20/23* (2014.01)
*H02S 20/22* (2014.01)
*H02S 20/20* (2014.01)
*H02S 20/10* (2014.01)

(52) U.S. Cl.
CPC ............ *H02S 20/24* (2014.12); *F24J 2/5203* (2013.01); *H02S 20/10* (2014.12); *H02S 20/20* (2014.12); *H02S 20/22* (2014.12); *H02S 20/23* (2014.12)

(58) Field of Classification Search
CPC .......... A47F 5/01; A47F 3/147; A47F 5/0031; A47F 5/0823; A47B 55/02; A47B 73/002; H02S 20/24

USPC ..... 211/181.1, 85.31, 85.17, 41.7, 133.5, 74, 211/59.1
See application file for complete search history.

(56) References Cited

U.S. PATENT DOCUMENTS 2,161,956 A 6/1939 Robertson
2,323,291 A 7/1943 Bens
(Continued)

FOREIGN PATENT DOCUMENTS

CN 102005484 A 4/2011
DE 2819901 A1 11/1979
(Continued)

OTHER PUBLICATIONS

Russell et al. of Ascension Technology, Inc., "PV Array Designs for Flat-Roof Buildings", article, 1993, pp. 1129-1133 (submitted as Exhibit 4 in USDC Case No. 4:08-cv-02807-SBA, filed Jan. 21, 2009).
(Continued)

*Primary Examiner* — Rodney Mintz
(74) *Attorney, Agent, or Firm* — Kolisch Hartwell, P.C.

(57) ABSTRACT

A photovoltaic module mounting system may include a right-hand support runner and a left-hand support runner. The support runners collectively define a rooftop contacting plane and a photovoltaic module support plane oriented at a predetermined angle relative to the rooftop contacting plane. The support runners may be interconnected with each other, and with additional support runners, to form an interconnected support structure that can be used to mount an array of photovoltaic modules upon a planar surface such as a building rooftop.

19 Claims, 12 Drawing Sheets

(56) References Cited

U.S. PATENT DOCUMENTS

| | | | |
|---|---|---|---|
| 2,575,917 A | 11/1951 | Johnson | |
| 2,596,007 A | 5/1952 | Casaroll | |
| 3,094,303 A | 6/1963 | Belger | |
| 3,116,171 A | 12/1963 | Nielsen et al. | |
| 3,171,403 A | 3/1965 | Drescher | |
| 3,292,306 A | 12/1966 | Carlson | |
| 3,411,952 A | 11/1968 | Ross et al. | |
| 3,415,475 A | 12/1968 | Goodman | |
| 3,457,427 A | 7/1969 | Tarneja et al. | |
| 3,565,719 A | 2/1971 | Webb | |
| 3,709,583 A | 1/1973 | Pfannkuch et al. | |
| 3,727,271 A | 4/1973 | Znamirowski | |
| 3,742,659 A | 7/1973 | Drew | |
| 3,965,954 A | 6/1976 | Lofredo | |
| 3,980,071 A | 9/1976 | Barber, Jr. | |
| 3,988,166 A | 10/1976 | Beam | |
| 3,990,762 A | 11/1976 | Lemesle | |
| 4,004,574 A | 1/1977 | Barr | |
| 4,019,924 A | 4/1977 | Kurth | |
| 4,025,786 A | 5/1977 | Hamilton | |
| 4,031,385 A | 6/1977 | Zerlaut et al. | |
| 4,040,867 A | 8/1977 | Forestieri et al. | |
| 4,045,934 A | 9/1977 | Sheahan et al. | |
| 4,062,137 A * | 12/1977 | Herzog | A47F 5/0823 |
| | | | 211/59.1 |
| 4,063,963 A | 12/1977 | Bond, Jr. | |
| 4,074,705 A | 2/1978 | Robinson, Jr. et al. | |
| 4,083,360 A | 4/1978 | Courvoisier et al. | |
| 4,086,599 A * | 4/1978 | VanderLinden, Jr. | H01Q 1/1235 |
| | | | 343/881 |
| 4,108,154 A * | 8/1978 | Nelson | F24J 2/14 |
| | | | 126/576 |
| 4,132,570 A | 1/1979 | Caruso et al. | |
| 4,137,097 A | 1/1979 | Kelly | |
| 4,137,897 A | 2/1979 | Moore | |
| 4,147,154 A | 4/1979 | Lewandowski | |
| 4,148,297 A | 4/1979 | Sherman, Jr. | |
| 4,148,298 A | 4/1979 | Sherman, Jr. | |
| 4,148,299 A | 4/1979 | Sherman, Jr. | |
| 4,154,221 A * | 5/1979 | Nelson | F24J 2/14 |
| | | | 108/2 |
| 4,165,853 A | 8/1979 | Brandt | |
| 4,191,794 A | 3/1980 | Shirland et al. | |
| 4,204,523 A | 5/1980 | Rothe | |
| 4,217,887 A | 8/1980 | Hoffman et al. | |
| 4,223,214 A * | 9/1980 | Dorian | F24J 2/38 |
| | | | 126/577 |
| 4,225,781 A | 9/1980 | Hammons | |
| 4,226,256 A * | 10/1980 | Hawley | F24J 2/5233 |
| | | | 126/569 |
| 4,237,863 A | 12/1980 | Harrison | |
| 4,238,912 A * | 12/1980 | MacDonald | E04D 3/24 |
| | | | 126/621 |
| 4,241,727 A | 12/1980 | Toti | |
| 4,245,895 A | 1/1981 | Wildenrotter | |
| 4,250,606 A | 2/1981 | Korenaga | |
| 4,261,613 A | 4/1981 | Alford | |
| 4,265,221 A | 5/1981 | Whinnery | |
| 4,265,422 A * | 5/1981 | Van Leeuwen | F24J 2/523 |
| | | | 136/244 |
| 4,266,530 A | 5/1981 | Steadman | |
| 4,269,173 A * | 5/1981 | Krueger | F24J 2/4636 |
| | | | 126/569 |
| 4,271,103 A * | 6/1981 | McAlister | B29C 47/0028 |
| | | | 126/665 |
| 4,295,621 A * | 10/1981 | Siryj | B23Q 1/5443 |
| | | | 126/573 |
| 4,309,857 A | 1/1982 | Lovering | |
| 4,326,843 A | 4/1982 | Smith | |
| 4,336,413 A * | 6/1982 | Tourneux | F24J 2/045 |
| | | | 136/251 |
| 4,345,587 A * | 8/1982 | Carvalho | F24J 2/268 |
| | | | 126/569 |
| 4,371,139 A * | 2/1983 | Clark | F24J 2/045 |
| | | | 136/244 |
| 4,389,826 A | 6/1983 | Kelly | |
| RE31,321 E | 7/1983 | Harrison | |
| 4,392,009 A | 7/1983 | Napoli | |
| 4,416,618 A | 11/1983 | Smith | |
| 4,421,943 A * | 12/1983 | Withjack | F24J 2/5264 |
| | | | 126/569 |
| 4,429,178 A * | 1/1984 | Prideaux | F24J 2/541 |
| | | | 126/573 |
| 4,429,952 A | 2/1984 | Dominguez | |
| 4,476,853 A * | 10/1984 | Arbogast | F24D 11/003 |
| | | | 126/572 |
| 4,502,467 A | 3/1985 | Smith | |
| 4,527,544 A * | 7/1985 | Wolf | A01G 9/222 |
| | | | 126/605 |
| 4,611,090 A * | 9/1986 | Catella | F24J 2/5232 |
| | | | 136/244 |
| 4,620,397 A | 11/1986 | Simpson et al. | |
| 4,620,771 A * | 11/1986 | Dominguez | F21S 11/00 |
| | | | 126/573 |
| 4,636,577 A * | 1/1987 | Peterpaul | F24J 2/045 |
| | | | 136/206 |
| 4,649,675 A | 3/1987 | Moldovan et al. | |
| 4,677,248 A * | 6/1987 | Lacey | F24J 2/5211 |
| | | | 126/569 |
| 4,712,338 A * | 12/1987 | Trickel | F24D 11/003 |
| | | | 126/569 |
| 4,718,404 A * | 1/1988 | Sadler | F24J 2/242 |
| | | | 126/621 |
| RE32,607 E | 2/1988 | Smith | |
| 4,724,010 A * | 2/1988 | Okaniwa | H01L 31/03921 |
| | | | 136/244 |
| 4,788,904 A | 12/1988 | Radtke | |
| 4,799,642 A * | 1/1989 | Wright | H01Q 1/1242 |
| | | | 248/237 |
| 4,860,509 A | 8/1989 | Laaly et al. | |
| 4,871,917 A | 10/1989 | O'Farrell et al. | |
| 4,905,579 A | 3/1990 | Dame | |
| 4,922,264 A | 5/1990 | Fitzgerald et al. | |
| 4,930,642 A * | 6/1990 | Brooks | A47F 5/13 |
| | | | 211/181.1 |
| 4,936,063 A | 6/1990 | Humphrey | |
| 4,966,631 A * | 10/1990 | Matlin | F24J 2/5232 |
| | | | 136/244 |
| 5,031,374 A | 7/1991 | Batch et al. | |
| 5,092,939 A * | 3/1992 | Nath | E04D 3/3605 |
| | | | 136/251 |
| 5,125,608 A * | 6/1992 | McMaster | F24J 2/5232 |
| | | | 126/570 |
| 5,142,293 A | 8/1992 | Ross | |
| 5,164,020 A * | 11/1992 | Wagner | E04D 3/366 |
| | | | 136/244 |
| 5,228,924 A * | 7/1993 | Barker | F24J 2/541 |
| | | | 136/246 |
| 5,232,518 A * | 8/1993 | Nath | E04D 3/3605 |
| | | | 136/244 |
| 5,252,141 A * | 10/1993 | Inoue | B32B 17/02 |
| | | | 136/251 |
| 5,316,592 A * | 5/1994 | Dinwoodie | E04D 11/02 |
| | | | 136/244 |
| 5,409,549 A * | 4/1995 | Mori | E04D 3/366 |
| | | | 136/244 |
| 5,505,788 A * | 4/1996 | Dinwoodie | F24J 2/34 |
| | | | 136/244 |
| 5,694,774 A | 12/1997 | Drucker | |
| 5,702,149 A | 12/1997 | Sweeney | |
| 5,741,370 A * | 4/1998 | Hanoka | B32B 17/10018 |
| | | | 136/251 |
| 5,746,839 A * | 5/1998 | Dinwoodie | F24J 2/5237 |
| | | | 136/246 |
| 5,762,720 A * | 6/1998 | Hanoka | B32B 17/10018 |
| | | | 136/251 |
| D408,554 S | 4/1999 | Dinwoodie | |
| 5,931,114 A * | 8/1999 | Bartholomew | B63B 17/02 |
| | | | 114/361 |
| 5,983,634 A | 11/1999 | Drucker | |

(56) References Cited

U.S. PATENT DOCUMENTS

| | | | | |
|---|---|---|---|---|
| 5,986,203 A * | 11/1999 | Hanoka | B32B 17/10018 136/251 |
| 6,000,663 A | 12/1999 | Plasse et al. | |
| 6,021,862 A | 2/2000 | Sharan | |
| 6,046,399 A * | 4/2000 | Kapner | F24J 2/045 136/244 |
| 6,061,978 A * | 5/2000 | Dinwoodie | E04D 13/17 136/244 |
| 6,065,255 A * | 5/2000 | Stern | E04D 3/3608 52/173.3 |
| 6,148,570 A * | 11/2000 | Dinwoodie | E04D 13/17 136/244 |
| 6,295,818 B1 * | 10/2001 | Ansley | F24J 2/36 126/624 |
| 6,313,394 B1 | 11/2001 | Shugar et al. | |
| D453,727 S | 2/2002 | Shugar et al. | |
| 6,414,237 B1 * | 7/2002 | Boer | F24J 2/5205 126/623 |
| 6,495,750 B1 * | 12/2002 | Dinwoodie | F24J 2/4638 136/244 |
| 6,501,013 B1 * | 12/2002 | Dinwoodie | F24J 2/523 136/244 |
| D471,855 S | 3/2003 | Shugar et al. | |
| 6,534,703 B2 * | 3/2003 | Dinwoodie | F24J 2/523 136/244 |
| 6,570,084 B2 * | 5/2003 | Dinwoodie | F24J 2/523 136/244 |
| 6,586,668 B2 | 7/2003 | Shugar et al. | |
| 6,672,018 B2 * | 1/2004 | Shingleton | F24J 2/5205 126/621 |
| 6,675,580 B2 * | 1/2004 | Ansley | F24J 2/36 126/624 |
| 6,702,370 B2 | 3/2004 | Shugar et al. | |
| 6,745,869 B2 * | 6/2004 | Garrett | B23D 45/003 182/45 |
| 6,809,251 B2 * | 10/2004 | Dinwoodie | F24J 2/523 136/244 |
| 6,809,253 B2 * | 10/2004 | Dinwoodie | F24J 2/523 136/244 |
| 6,883,290 B2 * | 4/2005 | Dinwoodie | E04D 1/18 136/246 |
| D510,315 S * | 10/2005 | Shugar | D13/102 |
| D511,576 S * | 11/2005 | Shingleton | D25/56 |
| RE38,988 E * | 2/2006 | Dinwoodie | F24J 2/5237 136/246 |
| 7,178,295 B2 * | 2/2007 | Dinwoodie | H02S 20/23 136/244 |
| 7,260,918 B2 * | 8/2007 | Liebendorfer | F24J 2/5205 136/244 |
| 7,268,743 B2 | 9/2007 | Lin | |
| 7,308,971 B2 | 12/2007 | Liebetreu et al. | |
| 7,328,534 B2 * | 2/2008 | Dinwoodie | H01L 31/052 136/244 |
| 7,406,800 B2 * | 8/2008 | Cinnamon | F24J 2/5211 136/244 |
| 7,411,562 B2 | 8/2008 | Lin | |
| 7,434,362 B2 * | 10/2008 | Liebendorfer | F24J 2/5205 136/244 |
| 7,487,771 B1 * | 2/2009 | Eiffert | F24J 2/5211 126/621 |
| 7,557,292 B2 * | 7/2009 | Shingleton | F24J 2/04 126/600 |
| 7,600,349 B2 * | 10/2009 | Liebendorfer | F24J 2/5207 136/244 |
| 7,748,175 B2 * | 7/2010 | Liebendorfer | F24J 2/5207 136/244 |
| 7,766,292 B2 * | 8/2010 | Liebendorfer | F24J 2/5205 136/244 |
| 7,807,918 B2 * | 10/2010 | Shingleton | F24J 2/04 136/243 |
| 7,810,286 B2 * | 10/2010 | Eiffert | F24J 2/5237 52/173.3 |
| 7,814,899 B1 * | 10/2010 | Port | F24J 2/5211 126/571 |
| 7,866,098 B2 * | 1/2011 | Cinnamon | F24J 2/5211 403/292 |
| 7,888,587 B2 * | 2/2011 | Shingleton | F24J 2/04 126/600 |
| 8,061,091 B2 * | 11/2011 | Botkin | F24J 2/5211 126/623 |
| 8,151,789 B2 * | 4/2012 | Klein | F24J 2/5237 126/621 |
| 8,276,330 B2 * | 10/2012 | Harberts | F24J 2/5239 136/244 |
| 8,307,606 B1 * | 11/2012 | Rego | H01L 31/05 126/621 |
| 8,316,618 B1 * | 11/2012 | Rodowca | H01L 31/05 126/621 |
| 8,316,619 B1 * | 11/2012 | Rego | H01L 31/05 126/621 |
| 8,336,277 B1 * | 12/2012 | Rego | H01L 31/05 126/621 |
| 8,464,990 B2 | 6/2013 | Flores | |
| 8,505,248 B1 * | 8/2013 | Leong | F24J 2/5239 52/173.3 |
| 8,558,101 B2 * | 10/2013 | Mascolo | F24J 2/4636 136/243 |
| 8,568,055 B2 | 10/2013 | Marques Lito Velez Grilo | |
| 8,893,445 B2 * | 11/2014 | Yen | F16C 11/04 126/623 |
| 9,052,123 B2 * | 6/2015 | Anderson | F24J 2/5233 |
| 9,093,948 B2 * | 7/2015 | Walz | H02S 20/24 |
| 9,109,814 B2 * | 8/2015 | Patton | F24J 2/4607 |
| 9,159,857 B2 * | 10/2015 | Kuo | H01L 31/042 |
| 9,263,985 B2 * | 2/2016 | Silberschatz | H02S 30/10 |
| 9,553,544 B2 * | 1/2017 | Nayar | H02S 20/23 |
| 9,628,019 B1 * | 4/2017 | Atcha | H02S 20/24 |
| 2001/0039960 A1 | 11/2001 | Shugar et al. | |
| 2002/0046764 A1 * | 4/2002 | Ansley | F24J 2/36 136/245 |
| 2002/0149536 A1 | 10/2002 | Safakhah | |
| 2002/0174889 A1 | 11/2002 | Shugar et al. | |
| 2003/0010372 A1 * | 1/2003 | Dinwoodie | F24J 2/523 136/244 |
| 2003/0010374 A1 * | 1/2003 | Dinwoodie | F24J 2/523 136/251 |
| 2003/0010375 A1 * | 1/2003 | Dinwoodie | F24J 2/523 136/251 |
| 2003/0015636 A1 * | 1/2003 | Liebendorfer | F24J 2/5205 248/237 |
| 2003/0015637 A1 * | 1/2003 | Liebendorfer | F24J 2/5205 248/237 |
| 2003/0029362 A1 * | 2/2003 | Ondrasik | A47F 5/01 108/110 |
| 2003/0101662 A1 * | 6/2003 | Ullman | E04D 13/12 52/27 |
| 2003/0154666 A1 * | 8/2003 | Dinwoodie | E04D 1/18 52/173.3 |
| 2003/0154667 A1 * | 8/2003 | Dinwoodie | H01L 31/052 52/173.3 |
| 2003/0154680 A1 * | 8/2003 | Dinwoodie | H02S 20/23 52/519 |
| 2003/0164187 A1 * | 9/2003 | Dinwoodie | F24J 2/523 136/251 |
| 2003/0177706 A1 * | 9/2003 | Ullman | E04D 13/12 52/3 |
| 2003/0222479 A1 | 12/2003 | Shugar et al. | |
| 2004/0007260 A1 * | 1/2004 | Dinwoodie | F24J 2/523 136/251 |
| 2004/0035806 A1 * | 2/2004 | Klein | A47F 7/08 211/34 |
| 2004/0163338 A1 * | 8/2004 | Liebendorfer | F24J 2/5207 52/173.1 |
| 2004/0261955 A1 * | 12/2004 | Shingleton | F24J 2/04 160/84.06 |
| 2005/0109384 A1 * | 5/2005 | Shingleton | F24J 2/04 136/244 |

(56) References Cited

U.S. PATENT DOCUMENTS

| | | | |
|---|---|---|---|
| 2005/0126621 A1* | 6/2005 | Dinwoodie | F24J 2/461 136/251 |
| 2005/0144870 A1* | 7/2005 | Dinwoodie | H01L 31/052 52/418 |
| 2005/0257453 A1* | 11/2005 | Cinnamon | F24J 2/5211 52/173.3 |
| 2006/0053706 A1* | 3/2006 | Russell | F24J 2/5211 52/173.3 |
| 2006/0196128 A1* | 9/2006 | Duke | F24J 2/5237 52/173.3 |
| 2006/0225780 A1* | 10/2006 | Johnson | F24J 2/5211 136/244 |
| 2007/0144575 A1* | 6/2007 | Mascolo | F24J 2/4636 136/246 |
| 2007/0151594 A1* | 7/2007 | Mascolo | F24J 2/5239 136/245 |
| 2007/0266672 A1* | 11/2007 | Bateman | E04D 3/352 52/747.1 |
| 2007/0295392 A1* | 12/2007 | Cinnamon | F24J 2/5211 136/251 |
| 2007/0295393 A1* | 12/2007 | Cinnamon | F24J 2/5211 136/251 |
| 2008/0010915 A1* | 1/2008 | Liebendorfer | F24J 2/5205 52/173.3 |
| 2008/0029148 A1* | 2/2008 | Thompson | F24J 2/5239 136/244 |
| 2008/0072951 A1* | 3/2008 | Gabor | H01L 31/188 136/244 |
| 2008/0105489 A1* | 5/2008 | Garrett | E04D 15/00 182/45 |
| 2008/0149170 A1* | 6/2008 | Hanoka | H02S 40/34 136/251 |
| 2009/0019796 A1* | 1/2009 | Liebendorfer | F24J 2/5207 52/173.3 |
| 2009/0078299 A1* | 3/2009 | Cinnamon | F24J 2/5211 136/244 |
| 2009/0104399 A1 | 4/2009 | Field | |
| 2009/0113822 A1* | 5/2009 | Patrina | F24J 2/5237 52/173.3 |
| 2009/0114269 A1* | 5/2009 | Fletcher | F24J 2/4607 136/251 |
| 2009/0134291 A1* | 5/2009 | Meier | F24J 2/5233 248/222.14 |
| 2009/0223142 A1* | 9/2009 | Shingleton | F24J 2/04 52/71 |
| 2009/0242014 A1* | 10/2009 | Leary | F24J 2/5239 136/251 |
| 2009/0266406 A1* | 10/2009 | Duke | F24J 2/5237 136/251 |
| 2009/0320906 A1* | 12/2009 | Botkin | F24J 2/5211 136/251 |
| 2010/0089389 A1* | 4/2010 | Seery | H01L 31/042 126/608 |
| 2010/0089390 A1* | 4/2010 | Miros | F24J 2/5239 126/608 |
| 2010/0147359 A1* | 6/2010 | Harberts | F24J 2/5239 136/246 |
| 2010/0179678 A1* | 7/2010 | Dinwoodie | F24J 2/461 700/103 |
| 2010/0212720 A1* | 8/2010 | Meyer | F24J 2/16 136/246 |
| 2010/0219304 A1* | 9/2010 | Miros | F24J 2/5205 248/125.8 |
| 2010/0229473 A1 | 9/2010 | Simpson et al. | |
| 2010/0236183 A1* | 9/2010 | Cusson | F24J 2/5207 52/645 |
| 2010/0243023 A1* | 9/2010 | Patton | F24J 2/4607 136/244 |
| 2010/0243827 A1* | 9/2010 | Zante | H02S 20/30 248/122.1 |
| 2010/0263297 A1* | 10/2010 | Liebendorfer | F24J 2/5207 52/11 |
| 2010/0269447 A1* | 10/2010 | Schuit | F24J 2/5205 52/698 |
| 2010/0269888 A1* | 10/2010 | Johnston, Jr. | F24J 2/5232 136/251 |
| 2010/0275974 A1* | 11/2010 | Chan | F24J 2/5211 136/251 |
| 2010/0293874 A1* | 11/2010 | Liebendorfer | F24J 2/5205 52/173.3 |
| 2010/0319277 A1* | 12/2010 | Suarez | F24J 2/523 52/173.3 |
| 2011/0024582 A1* | 2/2011 | Gies | F24J 2/5239 248/122.1 |
| 2011/0056536 A1* | 3/2011 | Meppelink | F24J 2/5237 136/244 |
| 2011/0067327 A1* | 3/2011 | Eiffert | F24J 2/5237 52/173.3 |
| 2011/0088740 A1* | 4/2011 | Mittan | F24J 2/5205 136/244 |
| 2011/0147325 A1* | 6/2011 | Kleinsasser | A47B 47/027 211/85.17 |
| 2011/0154774 A1* | 6/2011 | Rawlings | F24J 2/5235 52/745.21 |
| 2011/0240101 A1* | 10/2011 | Sagayama | F24J 2/4614 136/251 |
| 2011/0253193 A1* | 10/2011 | Korman | F24J 2/36 136/245 |
| 2012/0031473 A1* | 2/2012 | Chan | F24J 2/5239 136/251 |
| 2012/0037214 A1* | 2/2012 | Sagayama | F24J 2/523 136/251 |
| 2012/0045286 A1 | 2/2012 | Oliveira | |
| 2012/0048351 A1* | 3/2012 | Rizzo | F24J 2/5239 136/251 |
| 2012/0080078 A1* | 4/2012 | Farrelly | H01L 31/049 136/251 |
| 2012/0085041 A1* | 4/2012 | Place | F24J 2/523 52/173.3 |
| 2012/0125869 A1* | 5/2012 | Abar | F24J 2/5233 211/26 |
| 2012/0186632 A1* | 7/2012 | Reinhold | F24J 2/4638 136/251 |
| 2012/0223032 A1* | 9/2012 | Rothschild | F24J 2/5237 211/41.1 |
| 2012/0223033 A1* | 9/2012 | Molek | F16B 7/18 211/41.1 |
| 2012/0240489 A1* | 9/2012 | Rivera | F24J 2/4638 52/173.3 |
| 2012/0285515 A1* | 11/2012 | Sagayama | F24J 2/5211 136/251 |
| 2012/0298201 A1* | 11/2012 | Stephan | H01L 31/02 136/259 |
| 2012/0318322 A1* | 12/2012 | Lanyon | F24J 2/5264 136/244 |
| 2013/0008490 A1* | 1/2013 | Rego | H01L 31/05 136/251 |
| 2013/0092215 A1* | 4/2013 | Schroeder | F24J 2/5232 136/251 |
| 2013/0112248 A1* | 5/2013 | McPheeters | F16B 2/065 136/251 |
| 2013/0200245 A1* | 8/2013 | Markiewicz | F16B 7/187 248/500 |
| 2013/0206957 A1* | 8/2013 | Kalman | F16D 3/18 248/660 |
| 2013/0234645 A1* | 9/2013 | Goei | H02J 7/0052 320/101 |
| 2013/0240015 A1* | 9/2013 | Chaimovski | H01L 31/045 136/245 |
| 2013/0247962 A1* | 9/2013 | Sakai | F24J 2/541 136/248 |
| 2014/0083488 A1* | 3/2014 | Song | F24J 2/5233 136/251 |
| 2014/0115977 A1* | 5/2014 | Egan | E04H 12/345 52/116 |
| 2014/0124018 A1* | 5/2014 | Goodman | H02S 20/30 136/251 |

(56) References Cited

U.S. PATENT DOCUMENTS

| | | | | |
|---|---|---|---|---|
| 2014/0130849 A1* | 5/2014 | Silberschatz | H02S 30/10 | 136/251 |
| 2014/0158649 A1* | 6/2014 | Al-Haddad | F24J 2/525 | 211/41.1 |
| 2014/0182663 A1* | 7/2014 | Kuo | H01L 31/0422 | 136/251 |
| 2014/0360951 A1* | 12/2014 | Ilzhoefer | F24J 2/5233 | 211/41.1 |
| 2015/0101996 A1* | 4/2015 | Nayar | H02S 20/23 | 211/41.1 |
| 2015/0222220 A1* | 8/2015 | Laitila | H02S 20/24 | 211/41.1 |
| 2015/0256120 A1* | 9/2015 | Anderson | H02S 20/10 | 136/251 |
| 2016/0020722 A1* | 1/2016 | Patton | F24J 2/4607 | 136/251 |
| 2016/0261223 A1* | 9/2016 | De Vogel | F24J 2/5233 | |

FOREIGN PATENT DOCUMENTS

| | | |
|---|---|---|
| DE | 7913751 U1 | 8/1982 |
| DE | 3611542 A1 | 10/1987 |
| DE | 102009051756 A1 | 1/2011 |
| EP | 1602133 B1 | 7/2008 |
| EP | 1665393 B1 | 5/2009 |
| EP | 2056359 A2 | 5/2009 |
| EP | 0991827 B1 | 3/2011 |
| EP | 1476617 B1 | 7/2011 |
| EP | 1412988 B1 | 8/2011 |
| EP | 1476614 B1 | 4/2012 |
| FR | 2451654 A1 | 10/1980 |
| GB | 1564887 A | 4/1980 |
| GB | 2145385 A | 3/1985 |
| JP | 2006-157055 A | 6/2006 |
| JP | 2009-224807 A | 10/2009 |
| JP | 2012-026116 A | 2/2012 |
| WO | 80/00035 A1 | 1/1980 |
| WO | 90/03663 A1 | 4/1990 |
| WO | 92/02699 A1 | 2/1992 |
| WO | 9400650 A1 | 1/1994 |
| WO | 96/00827 A1 | 1/1996 |
| WO | 97/38185 A1 | 10/1997 |
| WO | 98/59122 A2 | 12/1998 |
| WO | 99/47809 A1 | 9/1999 |
| WO | 00/46056 A1 | 8/2000 |
| WO | 01/01498 A1 | 1/2001 |
| WO | 02/16707 A1 | 2/2002 |
| WO | 03/007388 A1 | 1/2003 |
| WO | 03/017380 A1 | 2/2003 |
| WO | 03/017381 A1 | 2/2003 |
| WO | 03/041180 A1 | 5/2003 |
| WO | 03/071047 A2 | 8/2003 |
| WO | 03/071054 A1 | 8/2003 |
| WO | 03/072891 A1 | 9/2003 |
| WO | 2004/081306 A2 | 9/2004 |
| WO | 2005/020290 A2 | 3/2005 |
| WO | 2007/076519 A2 | 7/2007 |

OTHER PUBLICATIONS

Peter Toggweiler of PMS Energie AG Mönchaltrorf, "Development of a flat roof integrated photovoltaic system", SOFREL R&D Project (Solar Flat Roof Element) research paper, Mar. 1994, 187 pages (submitted as Exhibit 6 in USDC Case No. 4:08-cv-02807-SBA, filed Jan. 21, 2009).

* cited by examiner

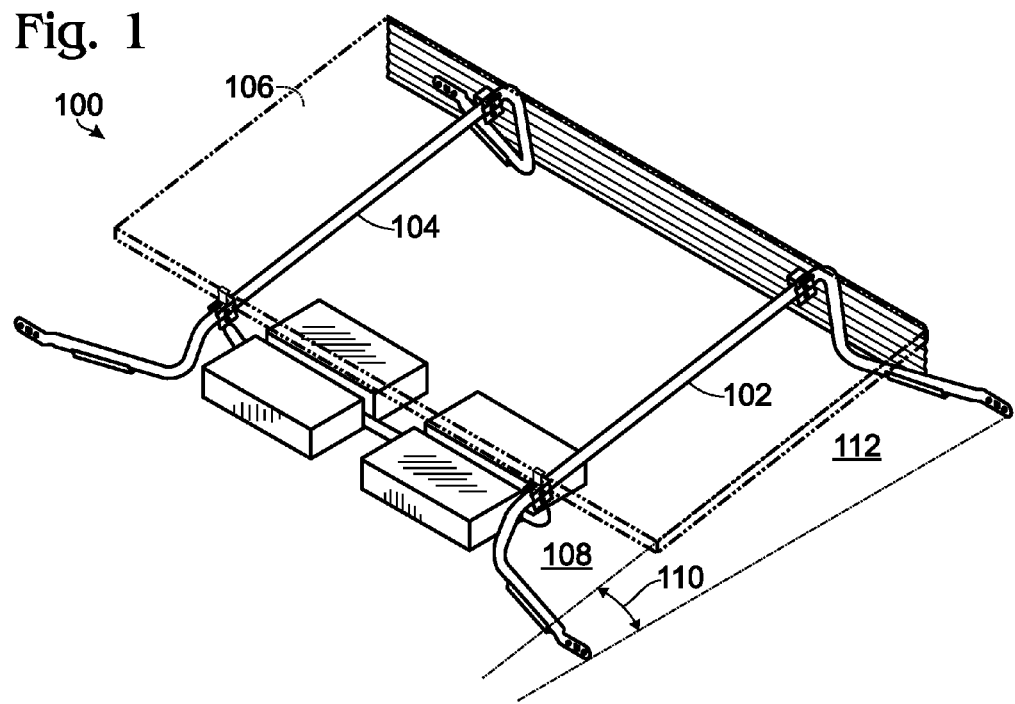
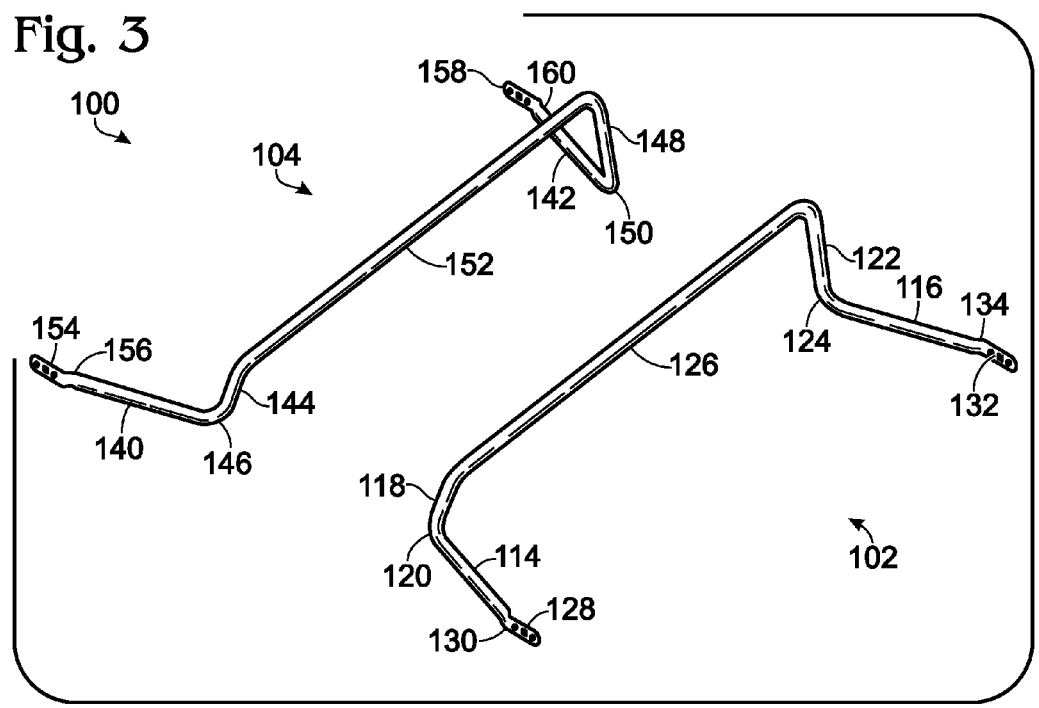

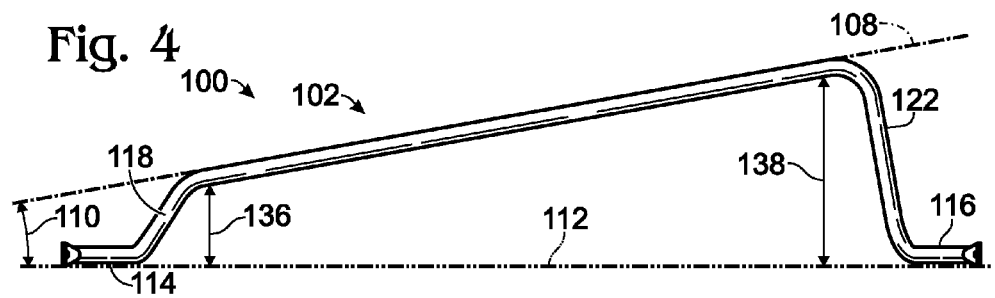
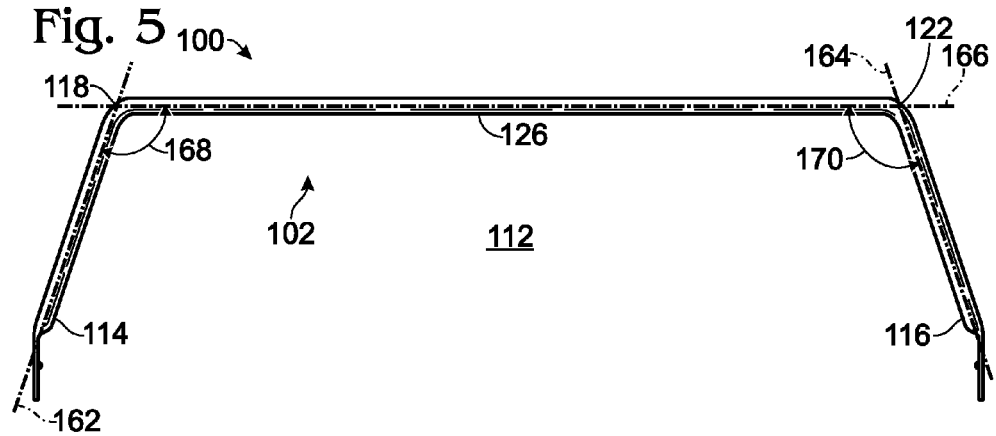
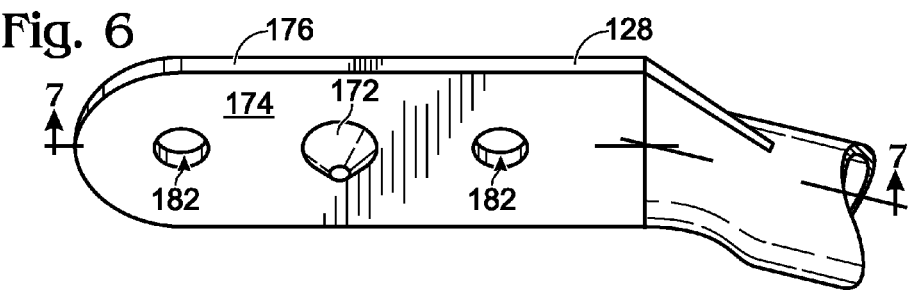
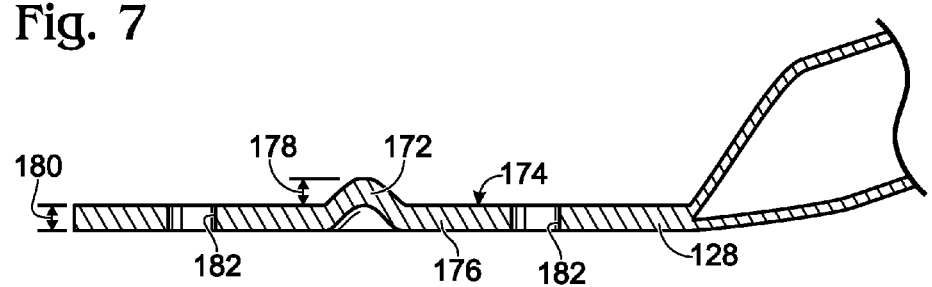

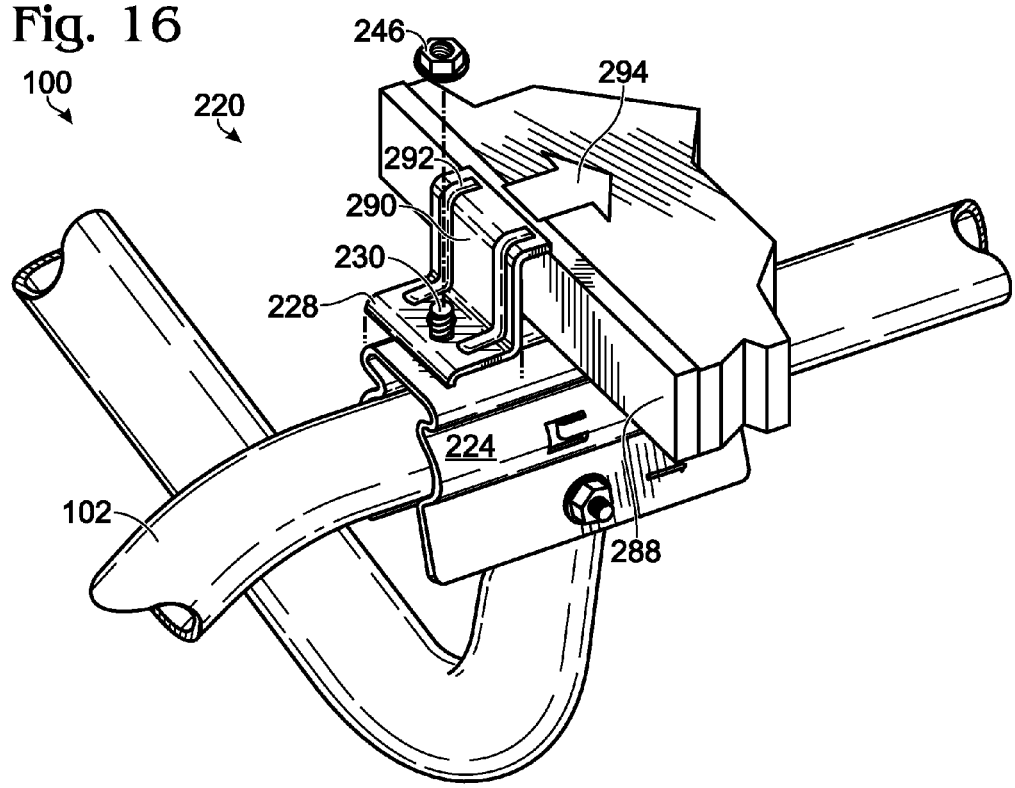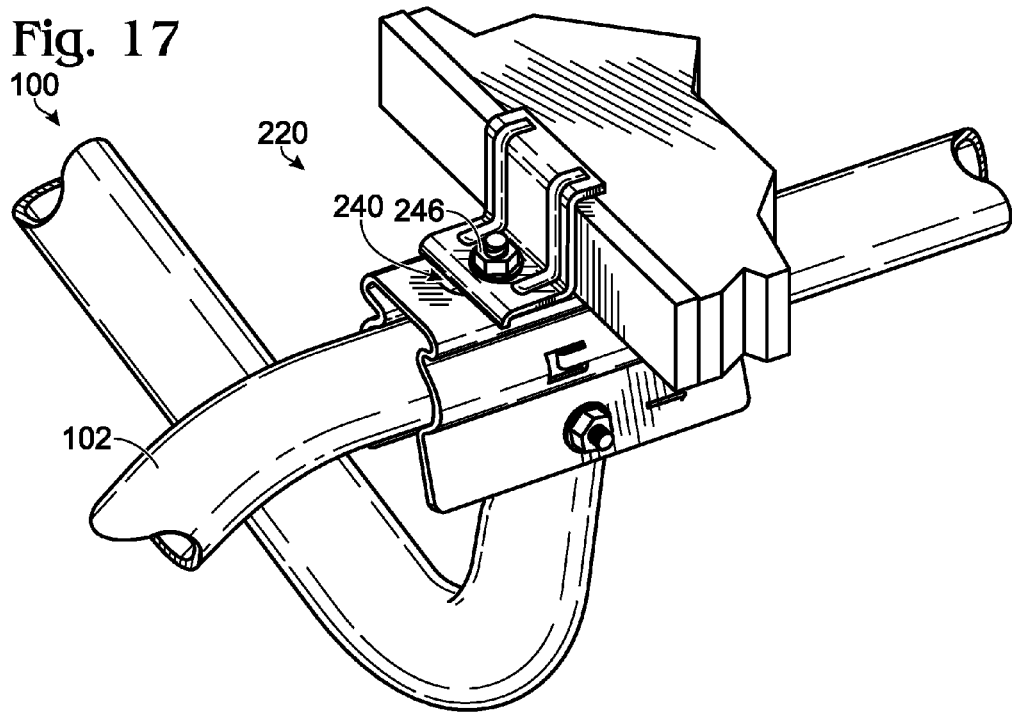

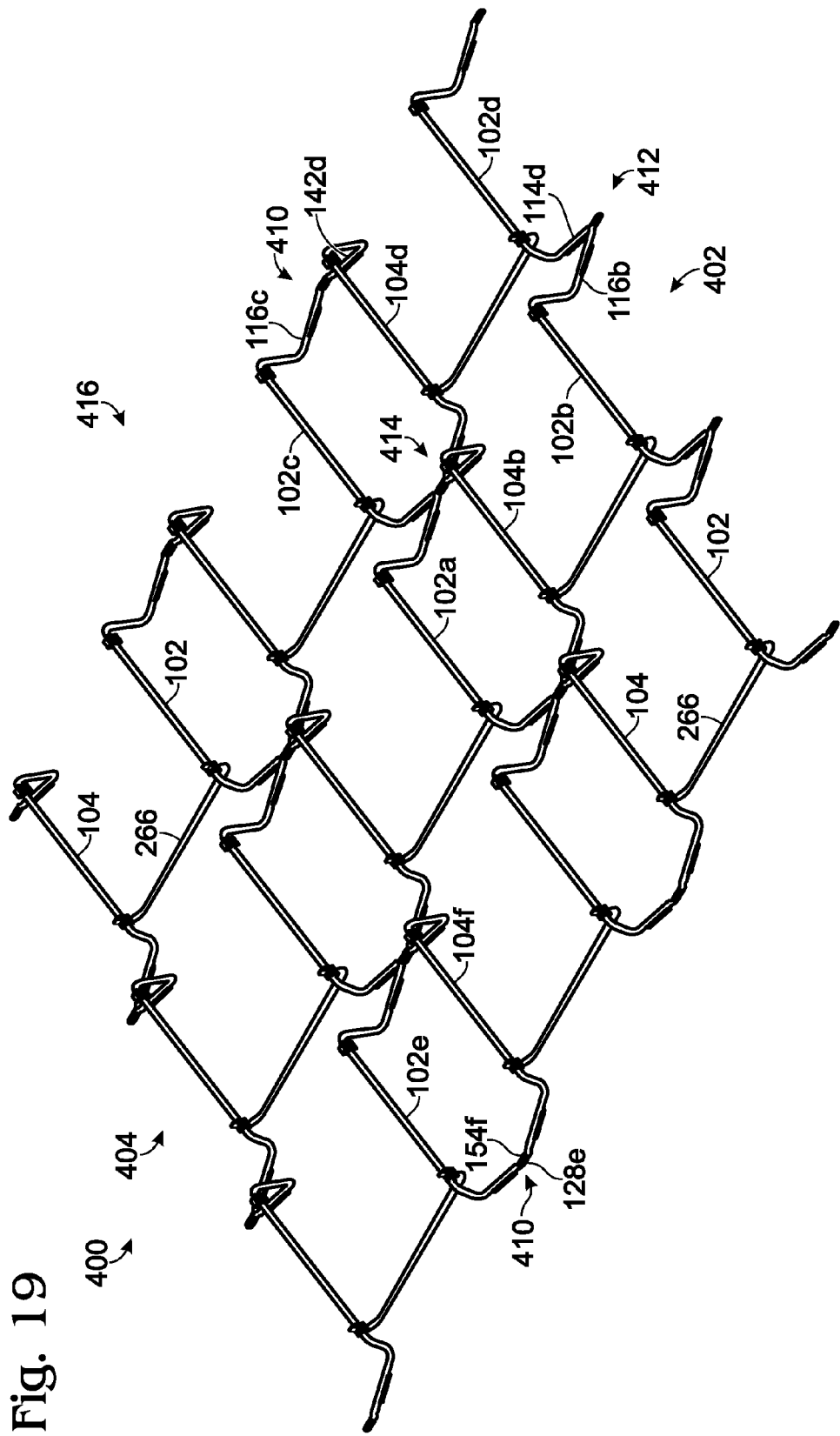

PHOTOVOLTAIC PANEL RACKING SYSTEM

CROSS-REFERENCE TO RELATED APPLICATION

This application is a continuation of U.S. patent application Ser. No. 15/260,950, filed Sep. 9, 2016, which is hereby incorporated by reference.

FIELD

This disclosure relates to solar panels. More specifically, the disclosed embodiments relate to systems and methods for supporting one or more solar panels on a surface.

INTRODUCTION

There are known systems for supporting a photovoltaic solar panel or an array of panels on a flat surface such as a roof. However, many of the known systems are complicated and installing such an array may take a considerable amount of time and may require a large number of tools. Further, some known mounting or racking systems are susceptible to damage caused by wind, for example by having a panel lifted out of an array or by shearing forces applied to the array.

There is a need for solar panel support racking systems which are easy to install, are easily adaptable to different installation constraints, which are resistant to shifting in linear directions due to wind forces, and which easily accommodate the electrical connections inherent to such an array.

SUMMARY

In some embodiments, a photovoltaic module mounting system may include a right-hand support runner and a left-hand support runner. Each support runner may include first and second separated rooftop contacting portions defining a rooftop contacting plane. Each support runner may further include a first curved extension portion extending from one end of the first rooftop contacting portion a first distance away from the rooftop contacting plane and a first connecting flange disposed at another, terminal end of the first rooftop contacting portion. Each support runner may include a second curved extension portion extending from one end of the second rooftop contacting portion a second distance away from the rooftop contacting plane and a second connecting flange disposed at another, terminal end of the second rooftop contacting portion. Each support runner may include a transverse module support portion connecting the first curved extension portion to the second curved extension portion, and thereby connecting the first and second rooftop contacting portions to each other, and first and second module clamp assemblies configured to be attached at respective ends of the transverse module support portion and to support a photovoltaic module. The transverse module support portion of the right-hand support runner and the transverse module support portion of the left-hand support runner may collectively define a photovoltaic module support plane oriented at a predetermined angle relative to the rooftop contacting plane.

In some embodiments, a photovoltaic module mounting system may include a first plurality of right-hand support runners and a second plurality of left-hand support runners. Each support runner may include first and second separated rooftop contacting portions defining a rooftop contacting plane. Each support runner may include a first curved extension portion extending from one end of the first rooftop contacting portion a first distance away from the rooftop contacting plane and a first connecting flange disposed at another, terminal end of the first rooftop contacting portion. Each support runner may include a second curved extension portion extending from one end of the second rooftop contacting portion a second distance away from the rooftop contacting plane and a second connecting flange disposed at another, terminal end of the second rooftop contacting portion. Each support runner may include a transverse module support portion connecting the first curved extension portion to the second curved extension portion, and thereby connecting the first and second rooftop contacting portions to each other, and first and second module clamp assemblies configured to be attached at respective ends of the transverse module support portion and to support a photovoltaic module. The transverse module support portion of each right-hand support runner and the transverse module support portion of an adjacent left-hand support runner may collectively define a photovoltaic module support plane oriented at a predetermined angle relative to the rooftop contacting plane. The first and second connecting flanges of each right-hand support runner may be configured to be brought into mating alignment and joined with the first and second connecting flanges, respectively, of one of the left-hand support runners to form an interconnected network of support runners.

In some embodiments, a photovoltaic module mounting system may include a first plurality of right-hand support runners and a second plurality of left-hand support runners. Each support runner may include first and second separated rooftop contacting portions defining a rooftop contacting plane. Each support runner may include a first curved extension portion extending from one end of the first rooftop contacting portion a first distance away from the rooftop contacting plane and a first connecting flange disposed at another, terminal end of the first rooftop contacting portion. Each support runner may include a second curved extension portion extending from one end of the second rooftop contacting portion a second distance away from the rooftop contacting plane and a second connecting flange disposed at another, terminal end of the second rooftop contacting portion. Each support runner may include a transverse module support portion connecting the first curved extension portion to the second curved extension portion, and thereby connecting the first and second rooftop contacting portions to each other, and first and second module clamp assemblies configured to be attached at respective ends of the transverse module support portion and to support a photovoltaic module. The transverse module support portion of each right-hand support runner and the transverse module support portion of an adjacent left-hand support runner may collectively define a photovoltaic module support plane oriented at a predetermined angle relative to the rooftop contacting plane. Each connecting flange of each right-hand support runner may be configured to be brought into mating alignment and joined with one of the connecting flanges of another right-hand support runner and with one of the connecting flanges of each of two left-hand support runners to form an interconnected web of four support runners.

The present disclosure provides systems and methods for mounting one or more photovoltaic modules to a generally horizontal surface. In some embodiments, the connections between support runners may provide added stability and resistance to shearing forces, wind, and other forces. In some embodiments, the photovoltaic mounting systems may be assembled easily and with the aid of a single tool.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is an isometric view of an embodiment of a photovoltaic module mounting system, according to aspects of the present disclosure.

FIG. 3 is an isometric view of a left-hand support runner and a right-hand support runner of the photovoltaic module mounting system of FIG. 1.

FIG. 4 is a side view of the right-hand support runner of FIG. 3.

FIG. 5 is a top plan view of the right-hand support runner of FIG. 3.

FIG. 6 is an isometric view of a first connecting flange of the right-hand support runner of FIG. 3.

FIG. 7 is a cross-sectional view of the first connecting flange, taken along line 7-7 in FIG. 6.

FIG. 16 is a detailed view of the second module clamp assembly of FIG. 10, showing a lower portion of a photovoltaic module in an as-yet unsecured position relative to the second module clamp assembly.

FIG. 17 is a detailed view of the second module clamp assembly of FIG. 10, showing the lower portion of the photovoltaic module in a secured position relative to the second module clamp assembly.

FIG. 19 is an isometric view of an embodiment of a photovoltaic module mounting system according to aspects of the present disclosure, showing a first plurality of right-hand support runners, a second plurality of left-hand support runners, and a plurality of u-shaped cross members arranged to form an interconnected network of support runners.

DESCRIPTION

Overview

Figure 2:
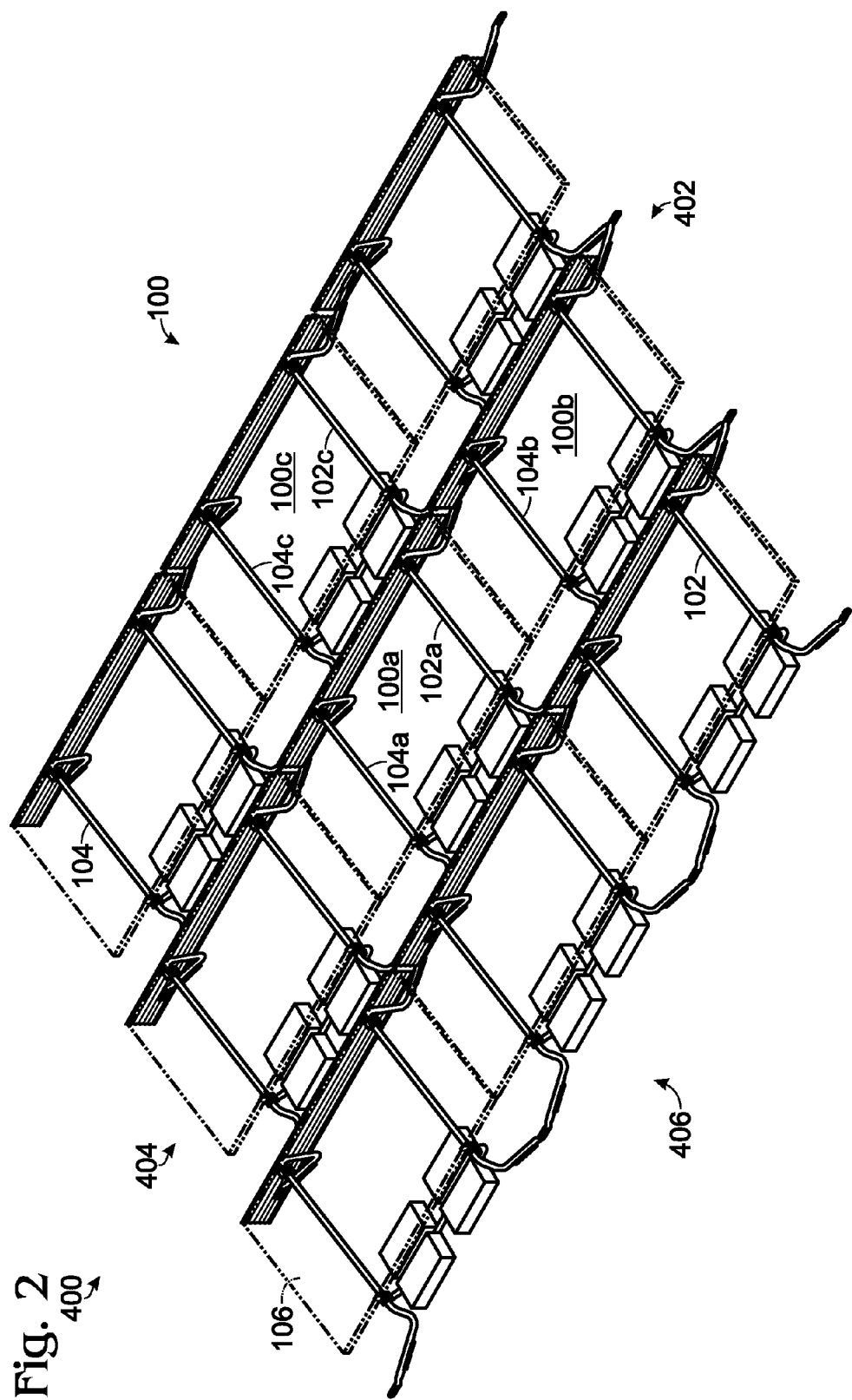
FIG. 2 is an isometric view of an embodiment of an array of photovoltaic modules supported by a photovoltaic module mounting system, according to aspects of the present disclosure.

Various embodiments of a photovoltaic (PV) module mounting system including left and right-hand support runners which provide support for the PV module and a tilt angle for the PV module are described below and illustrated in the associated drawings. Unless otherwise specified, a PV module mounting system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other racking systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

FIG. 1 is an isometric view of an embodiment of a photovoltaic module mounting system, generally indicated at 100. PV module mounting system 100 includes a right-hand support runner 102 and a left-hand support runner 104. Together, the right-hand support runner and the left-hand support runner may be configured to support a photovoltaic module or solar panel 106. Solar panel 106 is depicted as transparent in FIG. 1 to show the underlying support structure of the right and left-hand support runners. The right-hand support runner and the left-hand support runner collectively define a photovoltaic module support plane 108 oriented at a predetermined angle 110 relative to a rooftop contacting plane 112. Solar panel 106 may lie in or parallel to PV module support plane 108 when the solar panel is supported by PV module mounting system 100, which is disposed on a rooftop or other flat surface that lies in or parallel to rooftop contacting plane 112.

PV module mounting system 100 may be configured to be mounted on any suitable flat surface, a common example of which is a generally horizontal or nearly horizontal surface such as a rooftop of a commercial building. In many cases, PV module mounting systems according to the present disclosure will be mounted on a flat surface that is within about five degrees of being horizontal. If system 100 is used in the Northern Hemisphere, then PV module support plane 108 may be inclined generally toward the South, though other installation considerations may warrant a different orientation. That is, a vector pointing normal to the PV module support plane may point generally in the vertical and Southern directions. So oriented, the "right-hand" support runner 102 may be disposed generally on the East side of system 100 and the "left-hand" support runner 104 may be disposed generally on the West side of system 100. PV module mounting system 100 will be discussed in greater detail in Example 1 below.

FIG. 2 is an isometric view of an embodiment of a PV module mounting system, generally indicated at 400, in the form of an interconnected array of individual PV module mounting systems of the general type shown in FIG. 1. In other words, PV module mounting system 400 may include two or more copies of PV module mounting system 100 shown in FIG. 1. System 100 may be considered modular, in the sense that multiple identical copies of system 100 may be joined together to form an array of the type exemplified in system 400.

PV module mounting system 400 includes a first plurality 402 of right-hand support runners 102 and a second plurality 404 of left-hand support runners 104, which are associated with each other in pairs. Each pair of right and left-hand support runners may support a PV module or solar panel 106. PV module mounting system 400 may be used to support an array 406 of PV modules or solar panels 106.

Adjacent individual mounting systems 100 within larger mounting system 400 may be connected by joining the right and left-hand support members of a first copy of system 100 with the right and/or left-hand support members of an adjacent second copy of system 100. Each copy of system 100 within system 400 may be connected to one or more than one other copy of system 100. As an example, consider PV module mounting systems 100a, 100b, and 100c within PV module mounting system 400. System 100b is adjacent and to the East of system 100a, while system 100c is adjacent and to the North of system 100a. System 100b may be coupled to system 100a by connecting the right-hand runner 102a of system 100a to the left-hand runner 104b of system 100b. System 100c may be coupled to system 100a by connecting the right-hand runner 102a of system 100a to the right-hand runner 102c of system 100c and by connecting the left-hand runner 104a of system 100a to the left-hand runner 104c of system 100c. PV module mounting system 400 will be discussed in greater detail in Example 2 below.

EXAMPLES, COMPONENTS, AND ALTERNATIVES

The following sections describe selected aspects of exemplary PV module mounting systems as well as related methods. The examples in these sections are intended for illustration and should not be interpreted as limiting the entire scope of the present disclosure. Each section may include one or more distinct inventions, and/or contextual or related information, function, and/or structure.

Example 1: Single PV Module Support

This example describes an illustrative embodiment of photovoltaic mounting system 100 described above in reference to FIG. 1 in more detail; see FIGS. 3-18.

FIG. 3 is an isometric view of right-hand support runner 102 and a left-hand support runner 104 of the photovoltaic module mounting system 100. FIG. 4 is a side view of the right-hand support runner. FIG. 5 is a top plan view of the right-hand support runner of FIG. 3. With the possible exception of the configuration of a pair of connecting flanges discussed in reference to FIGS. 6-8, the right-hand support runner and the left-hand support runner may be generally mirror images of one another. FIGS. 3-5 are herein described as a group.

Right-hand support runner 102 includes a first rooftop contacting portion 114, a second rooftop contacting portion 116, a first curved extension portion 118 extending from one end 120 of first rooftop contacting portion 114, a second curved extension portion 122 extending from one end 124 of second rooftop contacting portion 116, and a transverse module support portion 126 connecting first curved extension portion 118 and second curved extension portion 122. By connecting the first and second curved extension portions, the transverse module support portion may thereby connect the first and second rooftop contacting portions 114 and 116 to each other. Right-hand support runner 102 may further include a first connecting flange 128 disposed at another, terminal end 130 of first rooftop contacting portion 114 and a second connecting flange 132 disposed at another, terminal end 134 of second rooftop contacting portion 116.

First rooftop contacting portion 114 and second rooftop contacting portion 116 may be separated or spaced from one another and may define a rooftop contacting plane 112. Rooftop contacting plane 112 may be any generally flat and/or horizontal plane, such as a generally flat plane within about five degrees of horizontal. First curved extension portion 118 extends from the end 120 of first rooftop contacting portion 114 a first distance 136 away from rooftop contacting plane 112. Second curved extension portion 122 extends from the end 124 of second rooftop contacting portion 116 a second distance 138 away from the rooftop contacting plane.

Left-hand support runner 104 includes a first rooftop contacting portion 140, a second rooftop contacting portion 142, a first curved extension portion 144 extending from one end 146 of first rooftop contacting portion 140, a second curved extension portion 148 extending from one end 150 of second rooftop contacting portion 142, and a transverse module support portion 152 connecting first curved extension portion 144 and second curved extension portion 148. By connecting the first and second curved extension portions, the transverse module support portion may thereby connect the first and second rooftop contacting portions 140 and 142 to each other. Left-hand support runner 104 may further include a first connecting flange 154 disposed at another, terminal end 156 of first rooftop contacting portion 140 and a second contacting flange 158 disposed at another, terminal end 160 of second rooftop contacting portion 142.

As with right-hand support runner 102, first rooftop contacting portion 140 and second rooftop contacting portion 142 of the left-hand support runner 104 may be separated or spaced from one another and may define rooftop contacting plane 112. First curved extension portion 144 extends from the end 146 of first rooftop contacting portion 140 by first distance 136 away from rooftop contacting plane 112. Second curved extension portion 148 extends from the end 150 of second rooftop contacting portion 142 second distance 138 away from the rooftop contacting plane.

Transverse module support portion 126 of right-hand support runner 102 and transverse module support portion 152 of left-hand support runner 104 collectively define the PV module support plane 108 described above. PV module support plane 108 may be oriented at predetermined angle 110 relative to rooftop contacting plane 112. In the embodiment shown in FIG. 4, the predetermined angle is ten degrees.

Many choices are possible for predetermined angle 110, including an angle of zero degrees where PV module support plane 108 is substantially parallel to rooftop contacting plane 112. In cases where a non-zero angle is desired, second distance 138 is greater than first distance 136, thereby causing the transverse module support portions 126 and 152 to be oriented at a non-zero angle relative to rooftop contacting plane 112. First distance 136 and second distance 138 may be any appropriate value so that PV module support plane 108 has the desired inclination relative to the rooftop contacting plane. Considerations for determining the desired angle may include the latitude of the installation location, the orientation of the surface on which system 100 is to be disposed, and the relative location of any obstacles which may prevent sunlight from reaching the PV module, among others.

Referring now in particular to FIG. 5, the first and second rooftop contacting portions 114 and 116 may extend from transverse module support portion 126 generally in a non-perpendicular direction. That is, the first rooftop contacting portion may define a first line 162, the second rooftop contacting portion may define a second line 164, and the transverse module support portion may define a third line 166. First line 162 and third line 166 may intersect at a first obtuse angle 168 when projected into a common plane, such as rooftop contacting plane 112. Second line 164 and third line 166 may intersect at a second obtuse angle 170 when projected into a common plane. Orienting the first and second rooftop contacting portions at obtuse angles relative to the transverse module support portion may increase the stability of system 100 relative to similar systems with members disposed at right angles, in particular when one or more PV module mounting systems 100 are combined into a mounting system configured to support an array of PV modules such as system 400 described herein.

One or both of right-hand support runner 102 and left-hand support runner 104 may be constructed, at least partially, of hollow tubing. In particular, any or all of first and second rooftop contacting portions 114, 140, 116, and 142; first and second curved extension portions 118, 144, 122, and 148; and transverse module support portions 126 and 152 may be constructed from hollow tubing. Hollow tubing may, for example, provide torsional flexibility to the support runners without permanent deformation. In addition, as described later in more detail, hollow tubing may provide a convenient mechanism to route wiring or other electrical connectors within a mounting system. In some examples, metallic tubing such as electric resistance welded (ERW) metallic-coated carbon steel mechanical tubing may be used.

FIG. 6 is an isometric view of first connecting flange 128 of right-hand support runner 102 and FIG. 7 is a cross-sectional view of first connecting flange 128, taken at 7-7 in FIG. 6, showing a protruding cone. FIGS. 6 and 7 are herein described together.

First connecting flange 128 may include a protrusion 172 extending from a flat face 174 of a major portion 176 of the first connecting flange. Protrusion 172 may be cone-shaped, frustoconical (i.e., in the shape of a truncated cone), or any other suitable shape. Protrusion 172 may extend from the flat face of the first connecting flange by a distance 178 equal, less than, or greater than a thickness 180 of the main portion of the first connecting flange. In the embodiment shown in FIGS. 6 and 7, the protrusion extends from the first face by a distance which is slightly greater than the thickness of the main portion.

First connecting flange 128 may include one or more connection apertures 182 extending through the main portion 176 of the flange. The connection apertures and protrusion 172 may facilitate coupling the right-hand support runner to one or more other right-hand support runners and/or one or more left-hand support runners to form a PV module mounting system capable of supporting an array of solar panels.

Second connecting flange 132 of right-hand support runner 102 may be substantially identical to first connecting flange 128. Second connecting flange 132 may also include a protrusion extending form a flat face of a major portion of the second connecting flange. The flat faces of the first and second connecting flanges from which the protrusions extend may be parallel to one another, see for example in FIG. 5. The protrusion of the first connecting flange may extend toward the second connecting flange and the protrusion of the second connecting flange may extend toward the first connecting flange.

Figure 8:
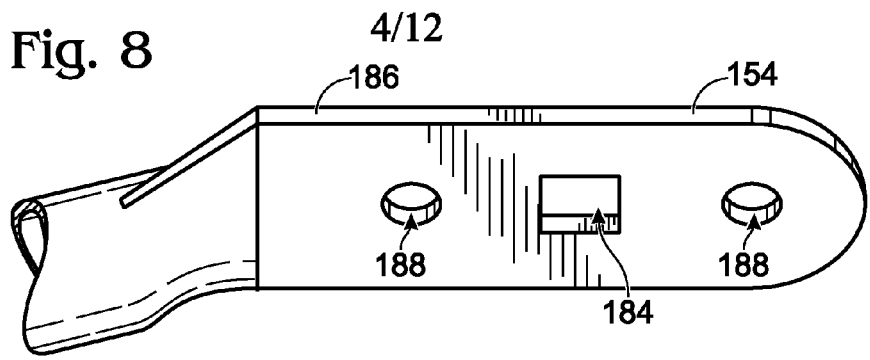
FIG. 8 is an isometric view of a first connecting flange of the left-hand support runner of FIG. 3.

FIG. 8 is an isometric view of first connecting flange 154 of left-hand support runner 104. First connecting flange 154 may include a protrusion-accepting aperture 184 extending through a major portion 186 of the first connecting flange. Protrusion-accepting aperture 184 may be configured to accept or receive a complementary protrusion, such as protrusion 172, from a first or second connecting flange of a right-hand support runner. A complementary arrangement of protrusions and apertures in the right-hand and left-hand support runners may facilitate alignment of support runners when forming a PV module mounting system capable of supporting an array of solar panels.

First connecting flange 154 of left-hand support runner 104 also may include one or more connection apertures 188 extending through the major portion 186 of the flange. When included in a system capable of supporting an array of solar panels, the connection apertures 188 may be aligned with the connection apertures 182 in a first or second connecting flange of a right-hand support runner and/or with the connection apertures 188 in a first or second connecting flange of another left-hand support runner. The second connecting flange 158 of left-hand support runner 104 may be substantially identical to first connecting flange 154.

Figure 9:
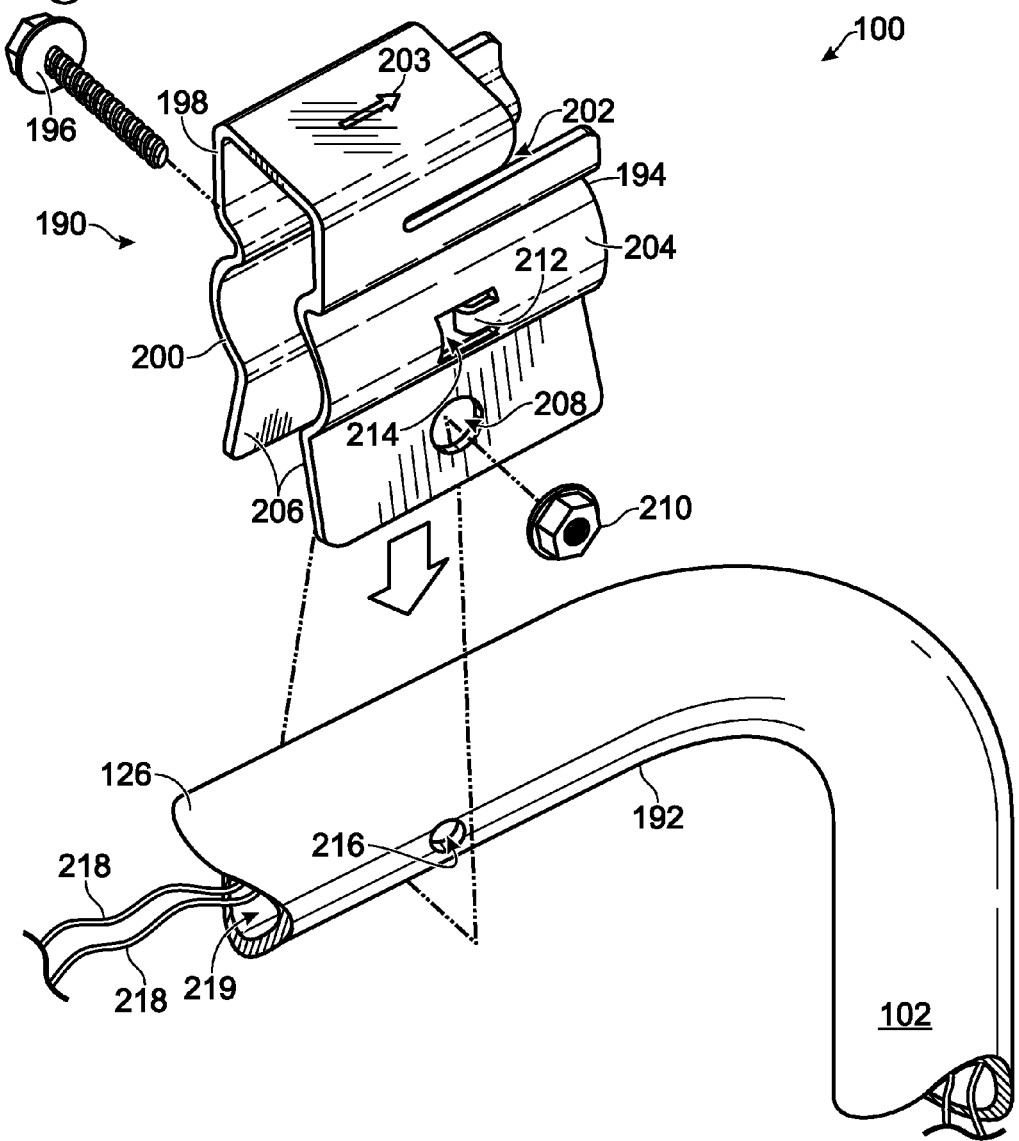
FIG. 9 is an exploded view of a first module clamp assembly of the photovoltaic module mounting system of FIG. 1.

FIG. 9 is an exploded view of a first module clamp assembly, generally indicated at 190, of photovoltaic module mounting system 100. The first module clamp assembly is configured to be attached at or proximate a first end 192 of transverse module support portion 126 of right-hand support runner 102. A similar first module clamp assembly may be configured to be attached at or proximate a first end of transverse module support portion 152 of left-hand support runner 104. The first module clamp assembly is configured to support or partially support a photovoltaic module, as further described below in reference to FIGS. 14 and 15.

First module clamp assembly 190 may include a first module clamp 194 and a fastener or attachment mechanism 196. First module clamp 194 may include an upper clamp portion 198 and a lower clamp portion 200. The upper clamp portion may be configured to be coupled to a portion of a photovoltaic module and may include any appropriate structure for coupling to a PV module. In some examples, upper clamp portion 198 may include a groove 202 configured to receive a complementary tongue portion of a PV module. The first module clamp may also include a visual indication 203 of the correct orientation of the first module clamp, such as an arrow.

Lower clamp portion 200 may be configured to be coupled to one or both of the right-hand and left-hand support runners and may include any appropriate structure for coupling to the support runners. In some examples, lower clamp portion 200 may include a tubular section 204 configured to receive the hollow tube of a support runner. Lower clamp portion 200 may further include a pair of flanges 206 extending from the tubular section, with each of the flanges including an aperture 208 through which attachment mechanism 196, in this case a bolt, may extend. A nut 210 may facilitate tightening of the flanges 206 toward one another which may secure the first module clamp to right-hand support 102.

Tubular section 204 may include an alignment tab 212 extending through an aperture 214 in the tubular section. The alignment tab may be configured to engage with an aperture 216 in support runner 102. This engagement may hold first module clamp 194 in a correct position relative to the support runner while the first module clamp is tightened via bolt 196 and nut 210.

First module clamp 194 may be constructed of a resiliently deformable material. That is, the first module clamp may deform slightly while being set in position on the support runner and/or while the attachment mechanism is tightened. An example of a resiliently deformable material is a high-strength low alloy steel.

System 100 may include electrical wiring 218 passing through at least portions of the hollow tubing. In some examples, the first and second rooftop contacting portions, the first and second curved extension portions, and the transverse module support portion of each support runner may all be constructed from hollow tubing having a central hollow bore 219 sized to receive and accommodate electrical wiring 218.

In some examples, the electrical wiring may be configured to electrically interconnect a PV module to one or more adjacent PV modules, in electrical series or parallel as desired. Alternatively or in addition, the electrical wiring may be configured to electrically connect a PV module to other circuitry external to system 100, such as an electricity distribution network. Having some or all of the electrical wiring of system 100 housed within the hollow tubing of a mounting system may protect the wiring form exposure to weather and may be aesthetically pleasing.

Figure 10:
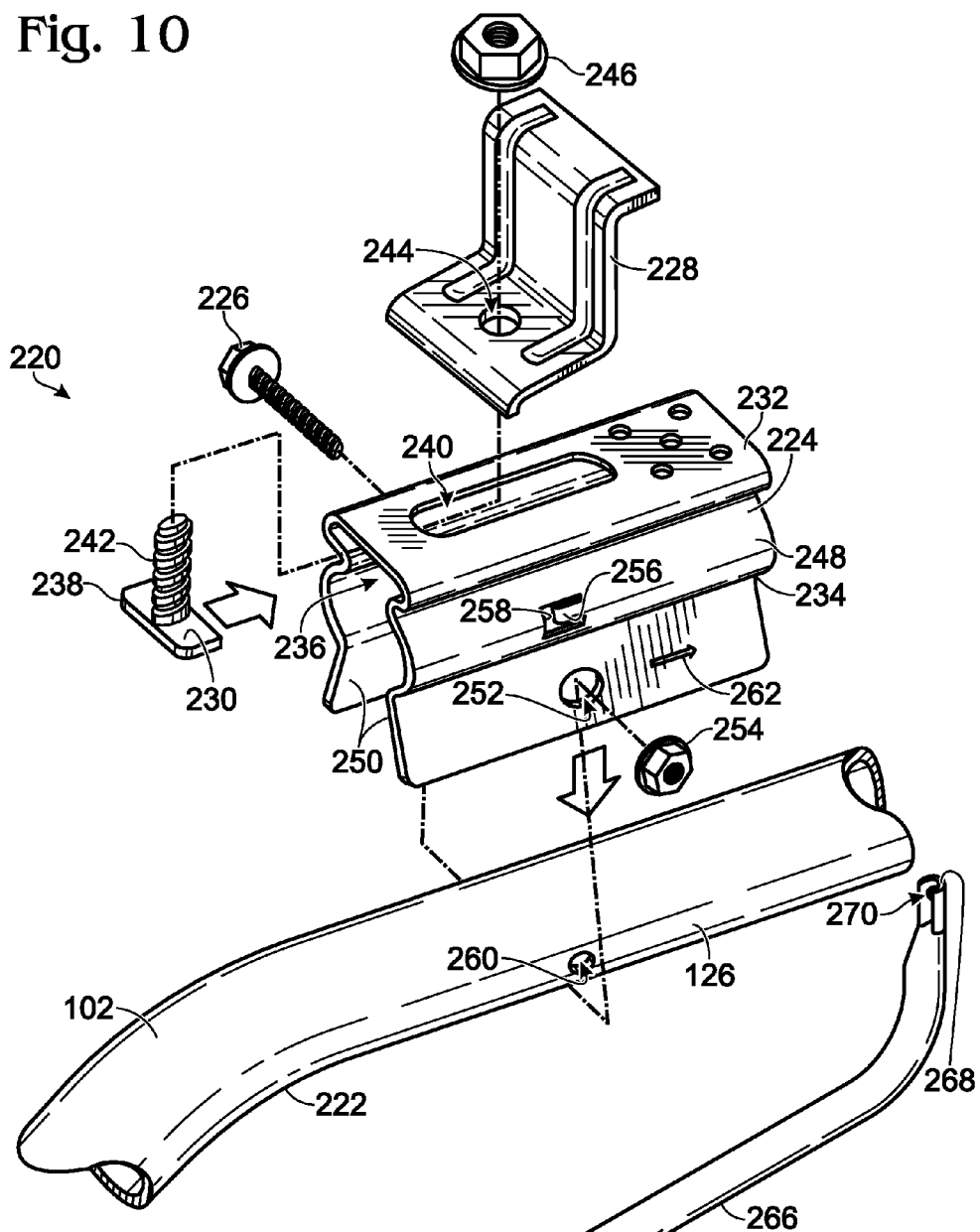
FIG. 10 is an exploded view of a second module clamp assembly of the photovoltaic module mounting system of FIG. 1, showing a connection between the second module clamp assembly and the right-hand support runner of FIG. 3.

FIG. 10 is an exploded view of a second module clamp assembly, generally indicated at 220, of photovoltaic module mounting system 100. The second module clamp assembly is configured to be attached at or proximate a second end 222 of transverse module support portion 126 of right-hand support runner 102. A similar second module clamp assembly may be configured to be attached at or proximate a second end of transverse module support portion 152 of left-hand support runner 104. The second module clamp assembly is configured to support or partially support a photovoltaic module, as further described below in reference to FIGS. 16 and 17.

Second module clamp assembly 220 may include a second module clamp 224, a fastener or attachment mechanism 226, a clip 228, and a clip attachment mechanism 230. The second module clamp assembly may be configured to be coupled to a portion of a photovoltaic module and may include any appropriate structure for coupling to a PV module. Specifically, in this embodiment, clip 228 may be used to receive and secure an edge portion of a photovoltaic module, as described below and shown, for example, in FIGS. 16-17.

Second module clamp 224 may include an upper clamp portion 232 and a lower clamp portion 234. In some examples, upper clamp portion 232 may include a slot 236 configured to receive a flange 238 of a T-shaped bolt 230 and an elongate aperture 240 oriented perpendicular to slot 236, the elongate aperture configured to receive a threaded portion 242 of T-shaped bolt 230 and permit the T-shaped bolt to move in a direction substantially parallel to transverse module support portion 126. The threaded portion 242 of bolt 230 may pass through an aperture 244 in clip 228 and engage with a threaded nut 246. Thus, clip 228 may be configured to move relative to second module clamp 224 and may be secured relative to the second module clamp via T-shaped bolt 230 and nut 246.

Lower clamp portion 234 may be configured to be coupled to one or both of the right-hand and left-hand support runners and may include any appropriate structure for coupling to the support runners. In some examples, lower clamp portion 234 may include a tubular section 248 configured to receive the hollow tube of a support runner. Lower clamp portion 234 may further include a pair of flanges 250 extending from the tubular section, with each of the flanges including an aperture 252 through which attachment mechanism 226, in this case a bolt, may extend. A nut 254 may facilitate tightening of the flanges 250 toward one another which may secure the second module clamp to right-hand support 102.

Tubular section 248 may include an alignment tab 256 extending through an aperture 258 in the tubular section. The alignment tab may be configured to engage with an aperture 260 in support runner 102. This engagement may hold second module clamp 224 in a correct position relative to the support runner while the second module clamp is tightened via bolt 226 and nut 254. The second module clamp may also include a visual indication 262 of the correct orientation of the first module clamp, such as an arrow.

Second module clamp 224 may be constructed of a resiliently deformable material. That is, the second module clamp may deform slightly while being set in position on the support runner and/or while the attachment mechanism is tightened. An example of a resiliently deformable material is a high-strength low alloy steel.

Figure 11:
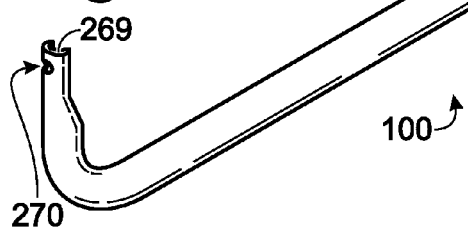
FIG. 11 is an isometric view of a u-shaped cross member of the photovoltaic module mounting system of FIG. 1.
Figure 12:
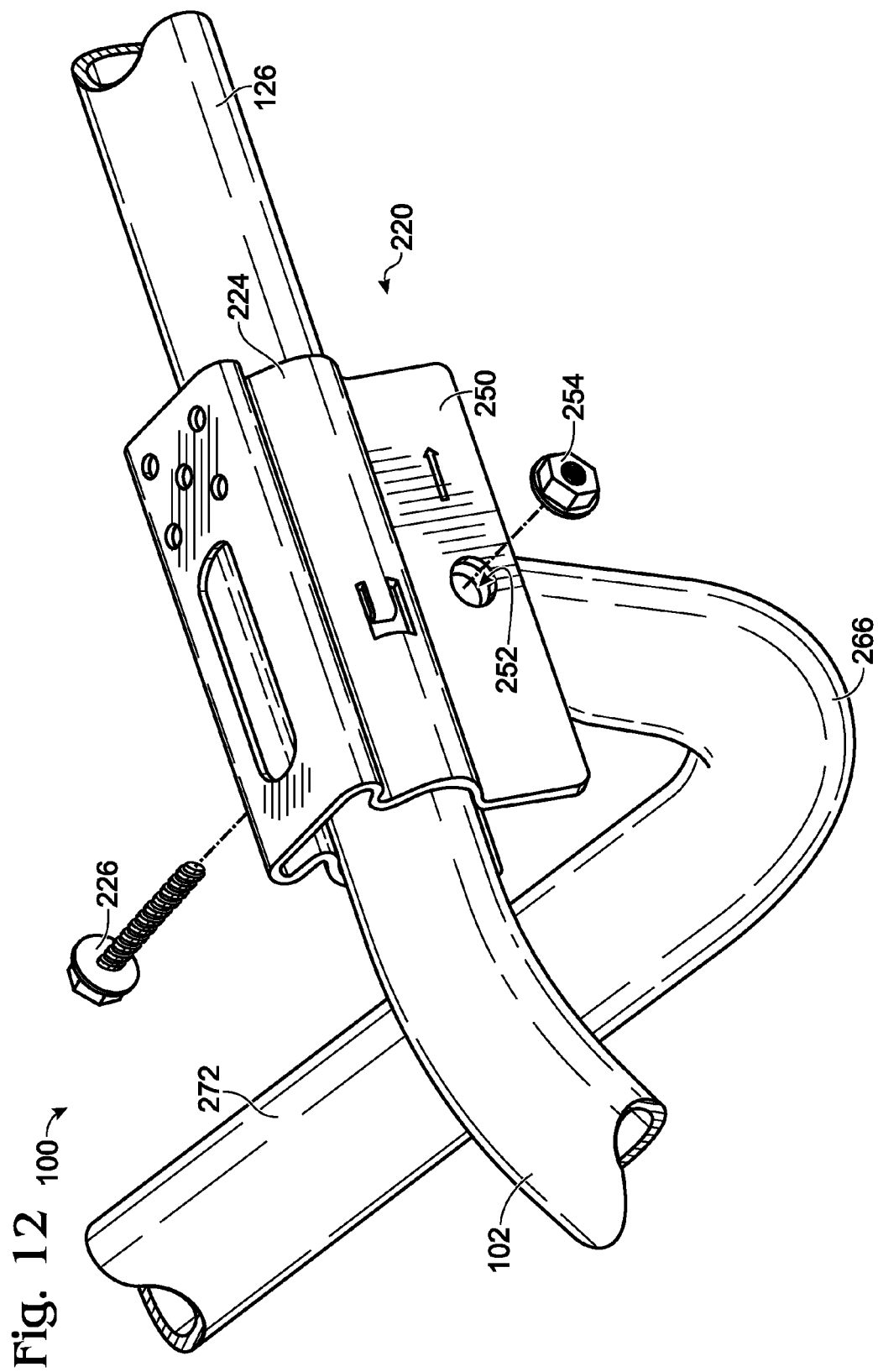
FIG. 12 is an exploded view of a distal end of the u-shaped cross member of FIG. 11, showing a connection between the distal end and the second module clamp assembly of FIG. 10.

FIG. 11 is an isometric view of a u-shaped cross member 266 of PV module mounting system 100, and FIG. 12 shows a first distal end 268 of the u-shaped crossbar member being attached to the second module clamp assembly 220. FIGS. 11 and 12 are herein described together.

U-shaped cross member 266 may have first distal end 268 configured to be joined to the transverse module support portion 126 of right-hand support runner 102 and a second distal end 269 configured to be joined to the transverse module support portion 152 of left-hand support runner 104. The distal ends of the u-shaped cross member may be joined to the transverse module support portions by passing a fastener, such as bolt 226 of the second module clamp assembly, through an aperture 270 proximate the distal end of the cross member and tightening nut 254. As described in reference to FIG. 10, bolt 226 may further pass through apertures 252 in the pair of flanges 250. The pair of flanges may be considered to be a rooftop-facing portion of second module clamp assembly 220 and each distal end 268 of the u-shaped cross member may be configured to be attached to a rooftop-facing portion of the second module clamp assembly.

It is possible to couple the u-shaped cross member to other locations along the transverse module support portions, such as proximate the first module clamp assembly or at an intermediate position between the first and second module clamp assemblies. In some examples, each distal end 268 of the u-shaped cross member 266 may be configured to be attached to a rooftop-facing portion of first module clamp assembly, for example to pair of flanges 206 shown in FIG. 9.

Figure 13:
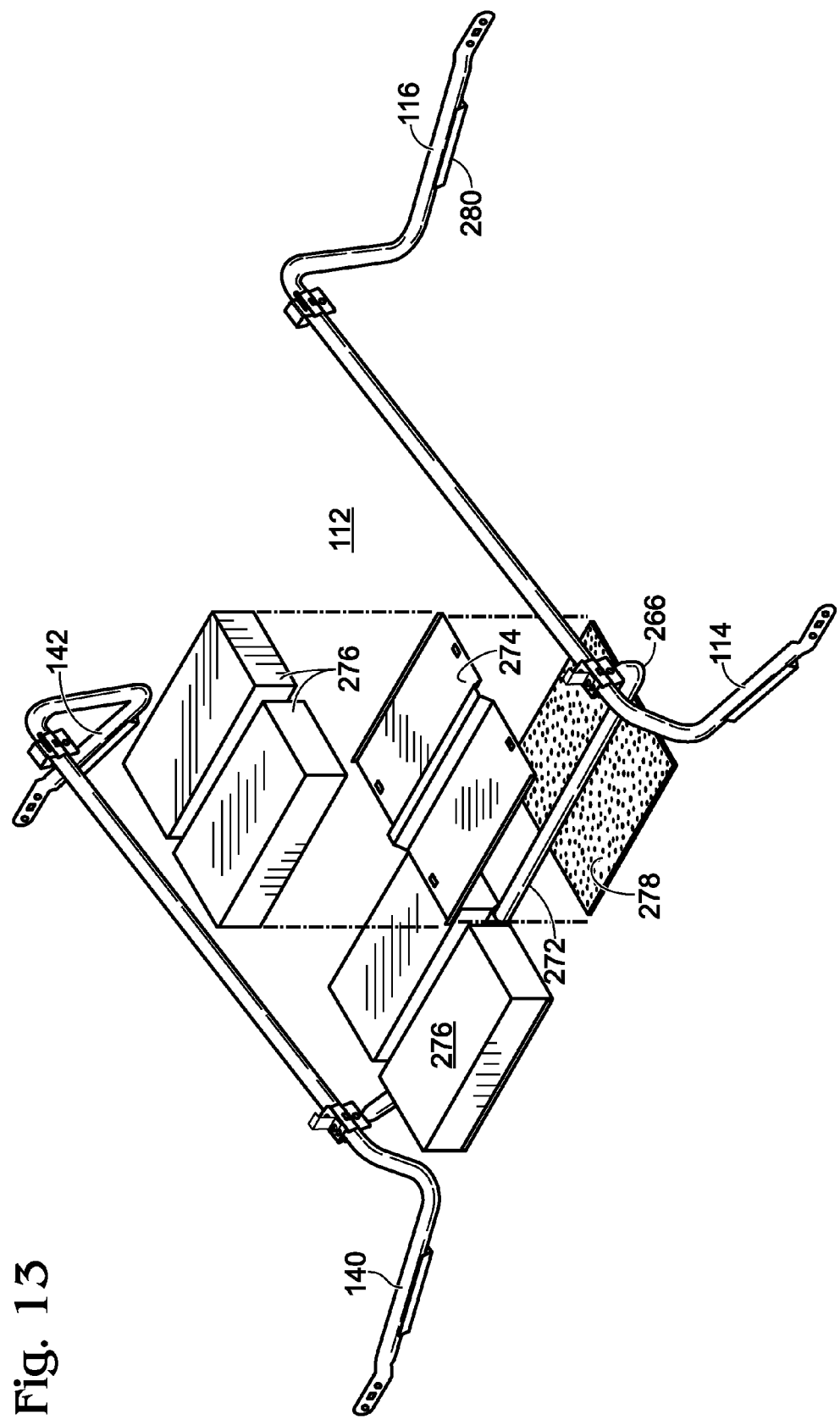
FIG. 13 is an exploded view of a portion of the photovoltaic module mounting system of FIG. 1, showing a ballast pan, a set of ballast stones, and a ballast pan pad.

The u-shaped cross member may further have a central portion 272 configured to be oriented to lie in or parallel to rooftop contacting plane 112, see also FIG. 13. U-shaped cross member 266 may help to spread the weight of the PV module mounting system and any associated PV modules or solar panels across whatever supporting surface the system is mounted upon.

FIG. 13 is an exploded view of a portion of photovoltaic module mounting system 100, including an optional ballast component. More specifically, system 100 may include one or more ballast pans 274 configured to overlay central portion 272 of the u-shaped cross member 266. Each of the ballast pans may be configured to receive one or more ballast stones 276. The ballast stones may prevent system 100 from lifting off the rooftop contacting plane 112 due to wind or other forces. Note that the central portion 272 of the u-shaped member may be configured to be oriented to lie in or parallel to the rooftop contacting plane so that the ballast pan is supported at least partially by the surface upon which system 100 is mounted, rather than exclusively by the central portion of the u-shaped cross member.

System 100 may include one or more protective pads, such as a ballast pan pad 278 and/or support runner pads 280, all of which are depicted in FIG. 13. These protective pads may prevent damage to the surface upon which system 100 is mounted. Ballast pan pad 278 may be configured to be disposed between the surface on which system 100 is mounted and the central portion 272 of u-shaped cross member 266. The ballast pan pad may have a surface area roughly comparable to ballast pan 274 and may be made of a variety of resilient, durable materials, for example rubber.

Support runner pads 280 may be configured to be disposed between a support surface and the rooftop contacting portions 114, 116, 140, 142 of the support runners. The support runner pads may be attached directly to the rooftop contacting portions, or may simply be disposed beneath the rooftop contacting portions. The support runner pads may be made of a variety of resilient, durable materials, for example rubber.

Turning now to FIGS. 14-17, first module clamp assembly 190 and second module clamp assembly 220 of system 100 are configured to support a photovoltaic module 106. That is, the photovoltaic module may be held in place by the first and second module clamp assemblies of the right-hand support runner 102 and the first and second module clamp assemblies of the left-hand support runner 104 collectively, see also FIG. 1.

Figure 14:
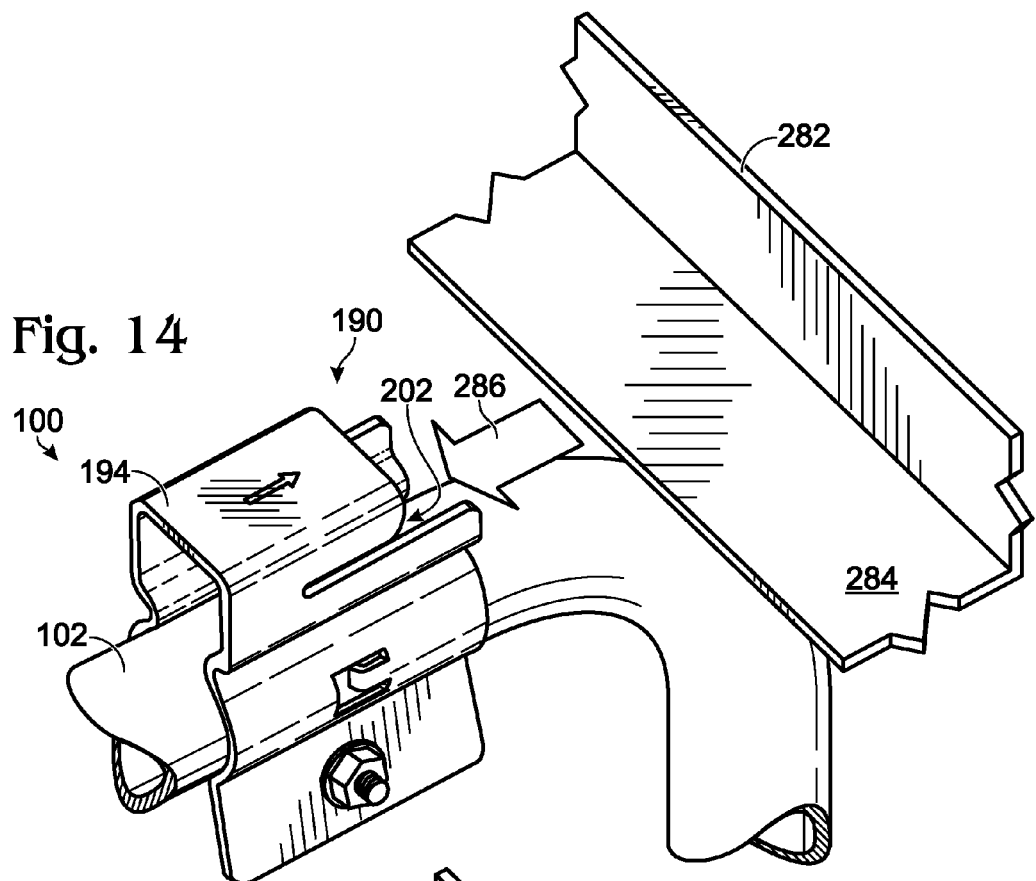
FIG. 14 is a detailed view of the first module clamp assembly of FIG. 9, showing a tongue portion of an upper portion of a photovoltaic module in an as-yet unsecured position relative to a groove in the first module clamp assembly.

FIG. 14 is a detailed view of the first module clamp assembly 190 coupled to right-hand support runner 102 and an upper portion 282 of photovoltaic module 106 in an as-yet unsecured position. The portion of the PV module which absorbs solar radiation is omitted from FIG. 14 so that the underlying support structure is viewable. The upper portion of the PV module may include a tongue portion 284 configured to be received by groove 202 of first module clamp 194. Tongue portion 284 may be received by groove 202 upon moving PV module 106 in a direction indicated by arrow 286.

Figure 15:
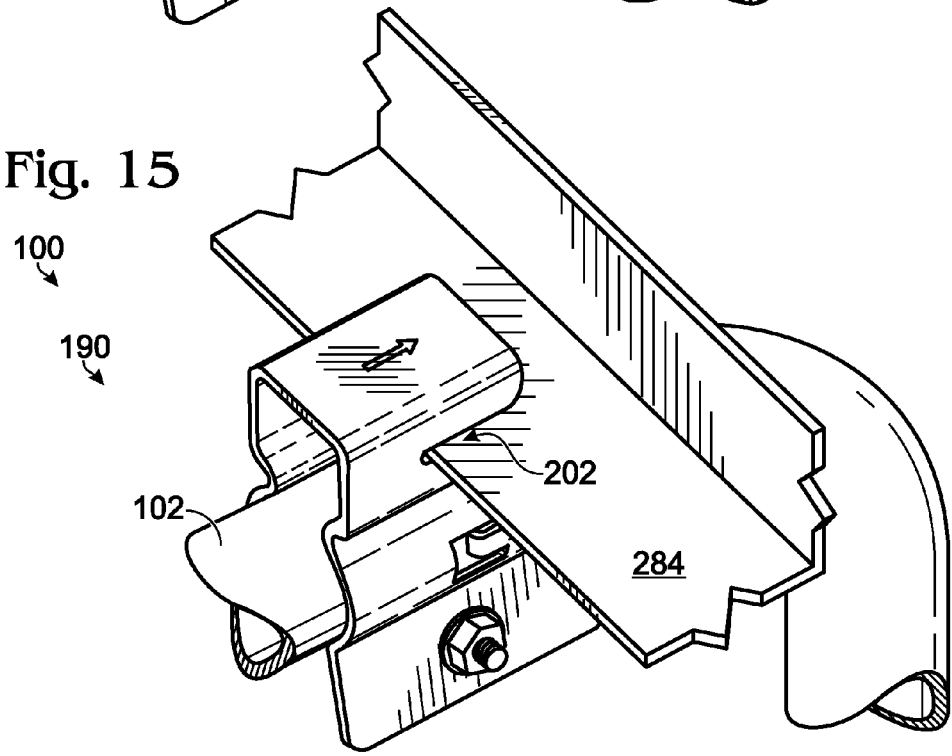
FIG. 15 is a detailed view of the first module clamp assembly of FIG. 9, showing the tongue portion of the photovoltaic module in a secured position relative to the groove in the first module clamp assembly.

FIG. 15 shows PV module 106 in a secured position relative to first module clamp assembly 190 with the tongue portion of the PV module received by the groove of the first module clamp assembly. Tongue portion 284 may remain in groove 202 due, in part, to gravitational forces acting on the PV module, which push the PV module toward the distal (inner) end of the groove, and which also create friction between the tongue portion and the groove. Similarly, the tongue portion may be received by groove of the first module clamp assembly coupled to the left-hand support runner 104, see for example in FIG. 1.

Groove 202 may have a variety of configurations depending on the configuration of the tongue portion it is intended to receive. The groove may have any of a plurality of thicknesses or orientations. In some examples, groove 202 may be largely parallel to the PV module support plane 108 shown in FIG. 1. In some examples, groove 202 may be inclined with respect to the PV module support plane. In some examples, groove 202 may have a variable thickness along its length, which may facilitate engagement with the tongue portion of the PV module.

FIG. 16 is a detailed view of the second module clamp assembly 220 coupled to right-hand support runner 102 and a lower portion 288 of PV module 106 in an as-yet unsecured position, and FIG. 17 shows clamp assembly 220 coupled to the right-hand support runner. Clip 228 may at first be held loosely in place relative to second module clamp 224 by nut 246 and T-shaped bolt 230. Clip 228 may have a rising portion 290 and a securing portion or lip portion 292 configured to grip the lower portion 288 of the PV module. By moving the clip toward the PV module in a direction indicated by arrow 294, with T-shaped bolt 230 moving within elongate aperture 240 shown in FIG. 10, the rising portion and the securing portion of clip may contact the lower portion of the PV module. The PV module may then be secured relative to the second module clamping assembly by turning nut 246.

Figure 18:
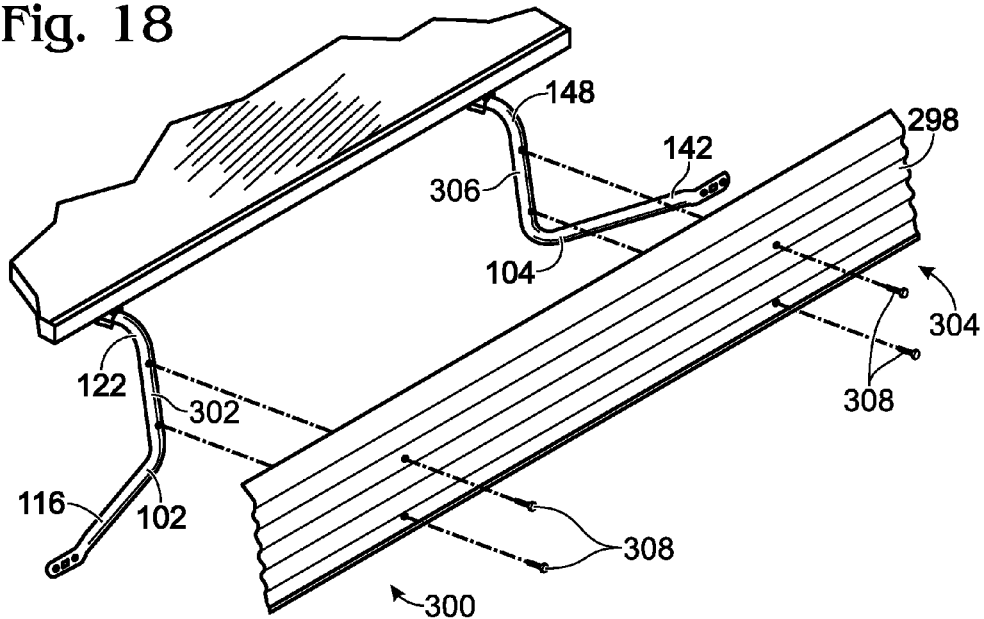
FIG. 18 is an exploded view of a wind deflector of the photovoltaic module mounting system of FIG. 1.

FIG. 18 is an exploded view of photovoltaic module mounting system 100, including an optional wind deflector 298. Wind deflector 298 has a right side, generally indicated at 300, which may be configured to attach to a central part 302 of second curved extension portion 122 of right-hand support runner 102 and to overlie a portion of second rooftop contacting portion 116 of the right-hand support runner. The wind deflector also has a left side, generally indicated at 304, which may be configured to attach to a central part 306 of second curved extension portion 148 of left-hand support runner 104 and to overlie a portion of second rooftop contacting portion 142 of the left-hand support runner. The wind deflector may be attached to the support runners via any appropriate mechanism, such as bolts 308, screws, rivets, or other fasteners.

Example 2: PV Module Array Support

Figure 20:
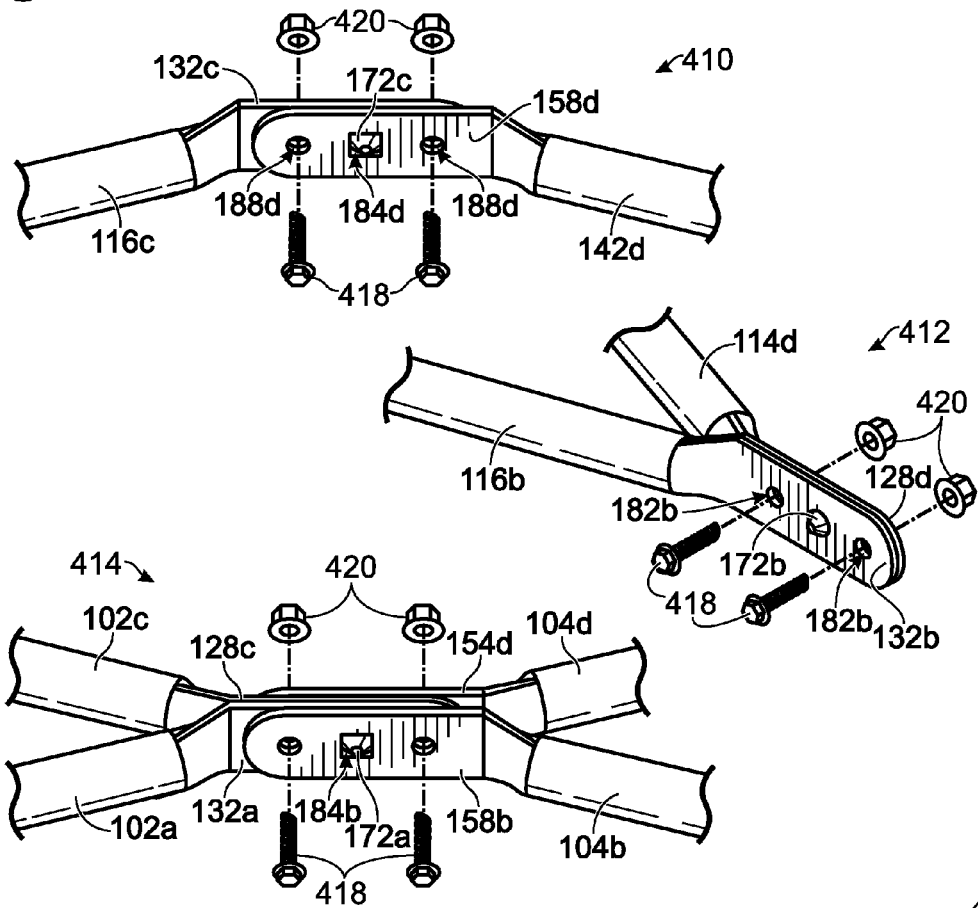
FIG. 20 is a detailed view of different connections between support runners in the photovoltaic module mounting system of FIG. 19.
Figure 21:
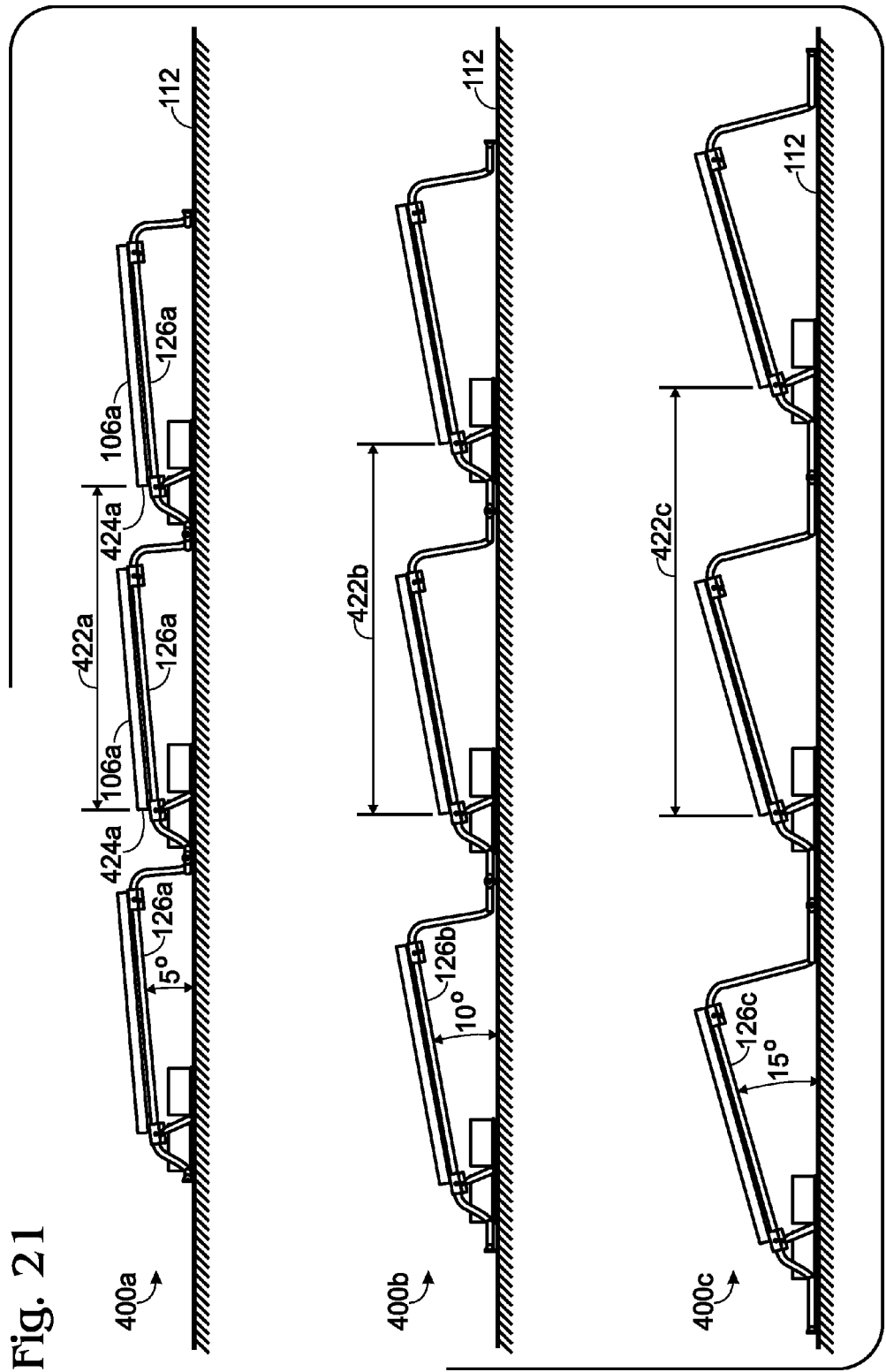
FIG. 21 is a right-side plan view of three embodiments of a photovoltaic module mounting system, with each of the three embodiments including photovoltaic modules oriented at a different non-zero angle relative to a rooftop contacting plane.

This example describes more details of an illustrative embodiment of photovoltaic mounting system 400 described above in reference to FIG. 2; see FIGS. 19-21.

FIG. 19 is an isometric view of photovoltaic module mounting system 400, showing first plurality generally indicated at 402 of right-hand support runners 102, a second plurality generally indicated at 404 of left-hand support runners 104, and a plurality of u-shaped cross members 266 arranged to form an interconnected network of support runners. FIG. 19 is a simplified version of FIG. 2 which included such optional elements as ballast pans, ballast stones, support runner pads, and wind deflectors. Cross members 266 may also be optional, though in some cases the cross member may facilitate appropriate spacing of the right and left-hand support runners.

FIG. 20 is a detailed view of various connections between support runners in photovoltaic module mounting system 400. Specifically, FIG. 20 shows an East-West connection generally indicated at 410, a North-South connection generally indicated at 412, and a four-way connection generally indicated at 414. Each of these three types of connections may be used in one or more locations when joining the plurality of right-hand support runners 102 with the plurality of left-hand support runners 104 to form an interconnected network of support runners, generally indicated at 416, as is shown in FIG. 19. FIGS. 19 and 20 are herein described together.

As an example of East-West connection 410, see in FIG. 19 first connecting flange 128e of right-hand support runner 102e which is configured to be brought into mating alignment and joined with first connecting flange 154f of left-hand support runner 104f. Similarly, see in FIG. 19 and FIG. 20 second connecting flange 132c extending from second rooftop contacting portion 116c of right-hand support runner 102c which is configured to be brought into mating alignment and joined with second connecting flange 158d extending from second rooftop contacting portion 142d of left-hand support runner 104d. The mating alignment may be provided by protrusion-accepting aperture 184d in the second connecting flange 158d receiving protrusion 172c of first connecting flange 132c. Second connecting flange 132c may be joined to second connecting flange 158d, for example, by one or more fasteners such as bolts 418 passing through connection apertures 188d (and 182c, see FIG. 6) with the bolts secured by one or more nuts 420.

As an example of North-South connection 412, see in FIGS. 19 and 20 second connecting flange 132b extending from second rooftop contacting portion 116b of right-hand support runner 102b which is configured to be brought into contact and joined with first connecting flange 128d extending from first rooftop contacting portion 114d of another right-hand support runner 102d. Note that protrusion 172b of flange 132b and protrusion 172d of flange 128d (not shown in FIG. 20) may point in opposite directions in connection 412 so as to not interfere with one another. As with connection 410, second connecting flange 132b may be joined to first connecting flange 128d, for example, by one or more bolts 418 passing through apertures 182b and 182d (not shown in FIG. 20), with the bolts secured by one or more nuts 420. Similar North-South connections may be made between connecting flanges of adjacent left-hand support runners, where there is no danger of interference between adjacent protrusion-accepting apertures of the connecting flanges.

As an example of four-way connection 414, see in FIGS. 19 and 20 where right-hand support runner 102a is configured to be brought into mating alignment and joined with one of the connecting flanges of another right-hand support 102c and with one or the connecting flanges of each of left-hand support runner 104d and left-hand support runner 104b to form an interconnected web of four support runners. In particular, second connecting flange 132a of right-hand support runner 102, first connecting flange 128c of right-hand support runner 102c, first connecting flange 154d of left-hand support runner 104d, and second connecting flange 158b of left-hand support runner 104b may be coupled together. Mating alignment may be provided by protrusions 172a and 172c (not shown) being received by protrusion-accepting apertures 184b and 184d (not shown), respectively. Bolts 418 may pass through connection apertures 188e, 182g, 182c, and 188d (some not shown) to be secured by nuts 420. Note that a three-way connection can also be made by omitting any of the four support runners involved in four-way connection 414.

All three types of connections described above, i.e., East-West connection 410, North-South connection 412, and four-way connection 414, have the associated rooftop contacting portions meeting at oblique angles, including acute and obtuse angles. These oblique connections between adjacent support runners may provide more stability and resistance to linear shearing than a comparable system when adjacent supports meet at perpendicular angles, and is akin to adding cross-bracing to a structure.

Referring now to FIGS. 1-20, it will be appreciated that any or all of the connections required for PV module mounting system 100 or PV module mounting system 400 may be made with a nut tightened on a bolt. It is therefore possible to assemble any of the mounting systems described herein quickly and efficiently, possibly using only one tool for tightening nuts onto bolts.

Turning now to FIG. 21, three illustrative embodiments of PV module mounting system 400 are shown: system 400a wherein transverse module support portions 126a are oriented at a non-zero angle of five degrees relative to the rooftop contacting plane 112, system 400b wherein transverse module support portions 126b are oriented at a non-zero angle of 10 degrees relative to the rooftop contacting plane 112, and system 400c wherein transverse module support portions 126c are oriented at a non-zero angle of fifteen degrees relative to the rooftop contacting plane 112. The depicted angles are merely exemplary, as any desired angle may be implemented into mounting systems according to the present teachings.

Adjacent PV modules 106 within PV mounting systems 400 may be separated by a North-South module spacing distance 422 measured, for example, from the front edge 424 of a first PV module to the front end of an adjacent PV module within the system. The North-South module spacing distance 422 may depend upon the non-zero angle to which the PV modules are inclined relative to rooftop contacting plane 112. For example, the North-South module spacing distance may increase with inclination angle of the PV modules, shown in FIG. 21 with distance 422c greater than distance 422b, which is in turn greater than distance 422a. Such a configuration may ensure that no shadows of a first PV module are cast upon an adjacent second PV module.

Advantages, Features, Benefits

The different embodiments of the PV module mounting systems described herein provide several advantages over known solutions for mounting one or more solar panels on a horizontal surface. For example, the illustrative embodiments of the PV module mounting systems described herein allow for quick and easy installation of the mounting system. Additionally, and among other benefits, illustrative embodiments of the PV module mounting systems described herein allow a modular system which is easily adapted to constraints at an installation site. Additionally, and among other benefits, illustrative embodiments of the PV module mounting systems described herein allow a modular system which is more resistant to shearing or shifting due to wind forces on the system. No known system or device can perform these functions, particularly in rooftop solar panel mounting system. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A photovoltaic module mounting system, comprising:
a first plurality of right-hand support runners and a second plurality of left-hand support runners, each support runner including:
first and second separated rooftop contacting portions defining a rooftop contacting plane,
a first curved extension portion extending from one end of the first rooftop contacting portion a first distance away from the rooftop contacting plane,
a first connecting flange disposed at another, terminal end of the first rooftop contacting portion,
a second curved extension portion extending from one end of the second rooftop contacting portion a second distance away from the rooftop contacting plane,
a second connecting flange disposed at another, terminal end of the second rooftop contacting portion,
a transverse module support portion connecting the first curved extension portion to the second curved extension portion and thereby connecting the first and second rooftop contacting portions to each other, and
first and second module clamp assemblies configured to be attached at respective ends of the transverse module support portion and to support a photovoltaic module;
wherein the transverse module support portion of each right-hand support runner and the transverse module support portion of an adjacent left-hand support runner collectively define a photovoltaic module support plane oriented at a predetermined angle relative to the rooftop contacting plane; and
wherein each connecting flange of each right-hand support runner is configured to be brought into mating alignment and joined with one of the connecting flanges of another right-hand support runner and with one of the connecting flanges of each of two left-hand support runners to form an interconnected web of four support runners.

2. The system of claim 1, wherein the first and second rooftop contacting portions, the first and second curved extension portions, and the transverse module support portion of each support runner are all substantially cylindrical in cross section.

3. The system of claim 1, wherein for each support runner, the first rooftop contacting portion defines a first line, the second rooftop contacting portion defines a second line, and the transverse module support portion defines a third line, wherein the first line and the third line intersect at a first obtuse angle when projected into a common plane, and wherein the second line and the third line intersect at a second obtuse angle when projected into a common plane.

4. The system of claim 1, further comprising a plurality of u-shaped cross members, each having a first distal end configured to be joined to the transverse module support portion of one of the right-hand support runners, a second distal end configured to be joined to the transverse module support portion of one of the left-hand support runners, and a central portion configured to be oriented to lie in the rooftop contacting plane.

5. The system of claim 4, further comprising a plurality of ballast pans, each configured to overlay the central portion of one of the u-shaped cross members and to receive one or more ballast stones.

6. A photovoltaic module mounting system, comprising:
a first plurality of right-hand support runners and a second plurality of left-hand support runners, each support runner including:
first and second separated rooftop contacting portions defining a rooftop contacting plane,
a first curved extension portion extending from one end of the first rooftop contacting portion a first distance away from the rooftop contacting plane,
a first connecting flange disposed at another, terminal end of the first rooftop contacting portion,
a second curved extension portion extending from one end of the second rooftop contacting portion a second distance away from the rooftop contacting plane,
a second connecting flange disposed at another, terminal end of the second rooftop contacting portion,
a transverse module support portion connecting the first curved extension portion to the second curved extension portion and thereby connecting the first and second rooftop contacting portions to each other, and
first and second module clamp assemblies configured to be attached at respective ends of the transverse module support portion and to support a photovoltaic module;
wherein the transverse module support portion of each right-hand support runner and the transverse module support portion of an adjacent left-hand support runner collectively define a photovoltaic module support plane oriented at a predetermined angle relative to the rooftop contacting plane; and
wherein the first and second connecting flanges of each right-hand support runner are configured to be brought into mating alignment and joined with the first and second connecting flanges, respectively, of one of the left-hand support runners to form an interconnected network of support runners.

7. The system of claim 6, wherein the first and second rooftop contacting portions, the first and second curved extension portions, and the transverse module support portion of each support runner are all hollow and substantially cylindrical in cross section.

8. The system of claim 6, further comprising a plurality of wind deflectors, each having a right side configured to attach to a central part of the second curved extension portion of one of the right-hand support runners and to overlie a portion of the second rooftop contacting portion of the same one of the right-hand support runners, and a left side configured to attach to a central part of the second curved extension portion of one of the left-hand support runners and to overlie a portion of the second rooftop contacting portion of the same one of the left-hand support runners.

9. The system of claim 6, wherein for each support runner, the first rooftop contacting portion defines a first line, the second rooftop contacting portion defines a second line, and the transverse module support portion defines a third line, wherein the first line and the third line intersect at a first obtuse angle when projected into a common plane, and wherein the second line and the third line intersect at a second obtuse angle when projected into a common plane.

10. The system of claim 6, further comprising a plurality of u-shaped cross members, each having a first distal end configured to be joined to the transverse module support portion of one of the right-hand support runners, a second distal end configured to be joined to the transverse module support portion of one of the left-hand support runners, and a central portion configured to be oriented to lie in the rooftop contacting plane.

11. The system of claim 10, further comprising a plurality of ballast pans, each configured to overlay the central portion of one of the u-shaped cross members and to receive one or more ballast stones.

12. A photovoltaic module mounting system, comprising:
a right-hand support runner and a left-hand support runner, each support runner including:
first and second separated rooftop contacting portions defining a rooftop contacting plane,
a first curved extension portion extending from one end of the first rooftop contacting portion a first distance away from the rooftop contacting plane,
a first connecting flange disposed at another, terminal end of the first rooftop contacting portion,
a second curved extension portion extending from one end of the second rooftop contacting portion a second distance away from the rooftop contacting plane,
a second connecting flange disposed at another, terminal end of the second rooftop contacting portion,
a transverse module support portion connecting the first curved extension portion to the second curved extension portion and thereby connecting the first and second rooftop contacting portions to each other, and
first and second module clamp assemblies configured to be attached at respective ends of the transverse module support portion and to support a photovoltaic module;
wherein the transverse module support portion of the right-hand support runner and the transverse module support portion of the left-hand support runner collectively define a photovoltaic module support plane oriented at a predetermined angle relative to the rooftop contacting plane.

13. The system of claim 12, wherein the second distance is greater than the first distance, thereby causing the transverse module support portions to be oriented at a non-zero angle relative to the rooftop contacting plane.

14. The system of claim 12, wherein for each support runner, the first rooftop contacting portion defines a first line, the second rooftop contacting portion defines a second line, and the transverse module support portion defines a third line, wherein the first line and the third line intersect at a first obtuse angle when projected into a common plane, and wherein the second line and the third line intersect at a second obtuse angle when projected into a common plane.

15. The system of claim 12, wherein the first and second rooftop contacting portions, the first and second curved extension portions, and the transverse module support portion are all constructed from hollow cylindrical tubing.

16. The system of claim 15, further comprising electrical wiring passing through at least portions of the hollow cylindrical tubing and configured to electrically interconnect the photovoltaic module to an adjacent photovoltaic module.

17. The system of claim 12, further comprising a u-shaped cross member having distal ends configured to be respectively joined to the transverse module support portions of each support runner, and a central portion configured to be oriented to lie in the rooftop contacting plane.

18. The system of claim 17, wherein each distal end of the u-shaped cross member is configured to be attached to a rooftop-facing portion of one of the module clamp assemblies.

19. The system of claim 17, further comprising a ballast pan configured to overlay the central portion of the u-shaped cross member and to receive one or more ballast stones.

* * * * *